(12) United States Patent
Sun et al.

(10) Patent No.: US 10,084,581 B2
(45) Date of Patent: Sep. 25, 2018

(54) OVERLAY UNICAST OR MBSFN DATA TRANSMISSION ON TOP OF MBSFN TRANSMISSION

(71) Applicant: QUALCOMM Incorporated, San Diego, CA (US)

(72) Inventors: Jing Sun, San Diego, CA (US); Tao Luo, San Diego, CA (US); Xiaoxia Zhang, San Diego, CA (US); Durga Prasad Malladi, San Diego, CA (US); Hao Xu, San Diego, CA (US); Yongbin Wei, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 273 days.

(21) Appl. No.: 14/743,395

(22) Filed: Jun. 18, 2015

(65) Prior Publication Data

US 2016/0013897 A1 Jan. 14, 2016

Related U.S. Application Data

(60) Provisional application No. 62/023,701, filed on Jul. 11, 2014.

(51) Int. Cl.
*H04L 5/00* (2006.01)
*H04L 1/00* (2006.01)
(Continued)

(52) U.S. Cl.
CPC .......... *H04L 5/005* (2013.01); *H04L 1/0058* (2013.01); *H04L 5/0051* (2013.01); *H04L 12/18* (2013.01);
(Continued)

(58) Field of Classification Search
CPC ..... H04L 12/18; H04L 5/0051; H04L 1/0058; H04B 7/0874; H04W 72/042
See application file for complete search history.

(56) References Cited

U.S. PATENT DOCUMENTS

2008/0159186 A1   7/2008 Steer
2010/0202386 A1*  8/2010 Takaoka ............... H04L 1/0083
                                                       370/329
(Continued)

OTHER PUBLICATIONS

IPEA/EPO, Second Written Opinion of the International Preliminary Examining Authority, Int'App. No. PCT/US2015/036562, dated Jun. 28, 2016, European Patent Office, Rijswijk, NL, 5 pgs.
(Continued)

*Primary Examiner* — Omer S Mian
(74) *Attorney, Agent, or Firm* — Holland & Hart LLP/Qualcomm

(57) ABSTRACT

Methods, systems, and devices are described for increased wireless communications system capacity through hierarchical modulation of multiple transmission layers during certain transmission subframes in a wireless communications system. Various deployment scenarios may be supported that may provide communications modulated on both a base modulation layer as well as on an enhancement modulation layer that is superpositioned on the base modulation layer. Reference signals may be provided for channel estimation for both the base modulation layer and enhancement modulation layer.

24 Claims, 22 Drawing Sheets

(51) Int. Cl.
| | |
|---|---|
| *H04L 27/34* | (2006.01) |
| *H04W 72/04* | (2009.01) |
| *H04L 12/18* | (2006.01) |
| *H04L 27/26* | (2006.01) |
| *H04W 72/00* | (2009.01) |

(52) U.S. Cl.
CPC ...... *H04L 27/2607* (2013.01); *H04L 27/3488* (2013.01); *H04W 72/042* (2013.01); *H04W 72/005* (2013.01)

(56) References Cited

U.S. PATENT DOCUMENTS

| | | | |
|---|---|---|---|
| 2010/0322129 A1 | 12/2010 | Niu et al. | |
| 2011/0103286 A1 | 5/2011 | Montojo et al. | |
| 2011/0103338 A1 | 5/2011 | Astely et al. | |
| 2011/0235562 A1* | 9/2011 | Tong | H04B 7/0874 370/312 |
| 2012/0213144 A1* | 8/2012 | Zhang | H04B 7/024 370/312 |
| 2015/0208389 A1* | 7/2015 | Imamura | H04J 11/00 370/329 |
| 2016/0080136 A1* | 3/2016 | Yang | H04L 5/001 370/280 |
| 2017/0064519 A1* | 3/2017 | Li | H04L 12/18 |

OTHER PUBLICATIONS

ISA/EPO, International Search Report and Written Opinion of the International Searching Authority, Int'l App. No. PCT/US2015/036562, dated Oct. 8, 2015, European Patent Office, Rijswijk, NL, 10 pgs.

* cited by examiner

OVERLAY UNICAST OR MBSFN DATA TRANSMISSION ON TOP OF MBSFN TRANSMISSION

CROSS REFERENCES

The present Application for Patent claims priority to U.S. Provisional Patent Application No. 62/023,701 by Sun et al., entitled "Overlay Unicast or MBSFN Data Transmission on Top of MBSFN Transmission," filed Jul. 11, 2014, assigned to the assignee hereof, and expressly incorporated by reference herein.

BACKGROUND

Field of the Disclosure

The present disclosure, for example, relates to wireless communication systems, and more particularly to concurrent transmission of multiple hierarchical layers during broadcast transmissions in wireless communications systems.

Description of Related Art

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of base stations, that can each support communication for a number of pieces of user equipment (UE). A UE may communicate with a base station via downlink and uplink. The downlink (or forward link) refers to the communication link from the base station to the UE, and the uplink (or reverse link) refers to the communication link from the UE to the base station. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Additionally, some systems may operate using time-division duplex (TDD), in which a single carrier is used for both uplink and downlink communications, and some systems may operate using frequency-division duplex (FDD), in which separate carrier frequencies are used for uplink and downlink communications.

As wireless communications networks become more congested, operators are seeking ways to increase capacity. Various approaches may include using small cells, unlicensed spectrum, and/or wireless local area networks (WLANs) to offload some of the traffic and/or signaling. In order to provide enhanced data rates through a wireless communications network, additional approaches to increase capacity may also be desirable.

SUMMARY

Methods, systems, and devices are described for increased system capacity through hierarchical modulation of multiple transmission layers during certain transmission subframes in a wireless communications system. Various deployment scenarios may be supported that may provide communications modulated on both a base modulation layer as well as on an enhancement modulation layer that is superpositioned on the base modulation layer. Thus, concurrent data streams that may be transmitted to same or different user equipments (UEs). Reference signals (RSs) for the enhancement modulation layer may be provided during a data resource element (RE) of a multicast broadcast single frequency network (MBSFN) transmission through, for example, puncturing the MBSFN data RE (i.e., transmitting the RS instead of data in the RE), or overlaying the RS on the MBSFN data RE (i.e., transmitting the RS on the enhancement modulation layer). In some deployments, reference signals for the enhancement modulation layer may be overlaid with MBSFN reference signals through, for example, code division multiplexing (CDM).

In some examples, a MBSFN transmission may be transmitted using a base modulation layer and a unicast or second MBSFN transmission may be concurrently transmitted using an enhancement modulation layer that is superimposed on the base modulation layer. A UE receiving both the base modulation layer and the enhancement modulation layer may decode content received on the base modulation layer, and perform interference cancellation to cancel the signal of the base modulation layer. The UE may then decode content received on the enhancement modulation layer.

According to a first set of examples, a method for wireless communications is described, the method including transmitting a multicast broadcast single frequency network (MBSFN) transmission during a first transmission period on a base modulation layer; and transmitting a unicast transmission during the first transmission period on an enhancement modulation layer that is superpositioned on the base modulation layer.

According to the first set of examples, an apparatus for wireless communications is described, the apparatus including a processor, memory in electronic communication with the processor and instructions stored in the memory. The instructions may be executable by the processor to: transmit a MBSFN transmission during a first transmission period on a base modulation layer; and transmit a unicast transmission during the first transmission period on an enhancement modulation layer that is superpositioned on the base modulation layer.

According to the first set of examples, an apparatus for wireless communications is described, the apparatus including means for transmitting a MBSFN transmission during a first transmission period on a base modulation layer; and means for transmitting a unicast transmission during the first transmission period on an enhancement modulation layer that is superpositioned on the base modulation layer.

According to the first set of examples, a non-transitory computer-readable medium is described, the non-transitory computer-readable medium storing code for wireless communication, the code including instructions executable by a processor to transmit a MBSFN transmission during a first transmission period on a base modulation layer; and transmit a unicast transmission during the first transmission period on an enhancement modulation layer that is superpositioned on the base modulation layer.

In some aspects of the method, apparatuses, and/or non-transitory computer-readable medium of the first set of examples, may transmit a reference signal for use in decoding information transmitted in the unicast transmission on the enhancement modulation layer during the first transmission period. The reference signal may be transmitted, for example, by a first transmitter on the enhancement modulation layer. In some examples, timing information may be provided that may indicate when the reference signal is to be transmitted. Such timing information may be transmitted, for example, in one or more of a system information block (SIB), master information block (MIB), or during radio resource control (RRC) signaling.

In certain examples, the reference signal may be a user equipment (UE) specific reference signal (UE-RS) that is transmitted by a first transmitter on the enhancement modulation layer concurrently with a transmission of a MBSFN reference signal (MBSFN-RS) that is transmitted on the base modulation layer. The UE-RS and MBSFN-RS may be, in some examples, code division multiplexed. In certain examples, the reference signal may puncture one or more data resource elements of the base modulation layer. In some examples, the reference signal may be transmitted in the enhancement modulation layer.

In certain examples, the unicast transmission may be transmitted by a first transmitter, and the reference signal may be concurrently transmitted in the enhancement modulation layer by the first transmitter. In some examples, timing information may be transmitted indicating when the reference signal is to be transmitted. Such timing information may be transmitted, for example, in one or more of a SIB, MIB, or during RRC signaling.

In further examples, both the unicast transmission and the MBSFN transmission may be transmitted using an extended cyclic prefix. In some examples, the reference signal may be transmitted during the first transmission period outside of resources used for the MBSFN transmission. For example, the reference signal may be transmitted in dedicated reference signal transmission resources, or in reference signal transmission resources shared with a physical downlink control channel (PDCCH).

In some examples, the unicast transmission may be transmitted using a set of code blocks transmitted during the first transmission period, and a data rate for each code block of the set of code blocks may be determined based at least in part on a transmission time within the first transmission period. A data rate for one or more of the code blocks is a function of a time duration between the code blocks and spaced further in time away from the reference signal is higher than a data rate for one or more of the code blocks spaced closer in time to the reference signal. In some examples, control information indicating the data rates for the set of code blocks may be transmitted.

In further examples, one or more other unicast transmissions may be transmitted on the base modulation layer outside of the first transmission period, and one or more transmission parameters of the other unicast transmissions may be based at least in part on a first channel state information (CSI) report associated with transmission resources of the other unicast transmissions, and one or more transmission parameters of the enhancement modulation layer unicast transmissions may be based at least in part on a second CSI report associated with transmission resources of the enhancement modulation layer. In some examples, channel estimation for the enhancement modulation layer unicast transmissions may be determined based at least in part on a common reference signal (CRS) and a noise estimation for the enhancement modulation layer unicast transmissions may be determined based at least in part on a MBSFN reference signal. In certain examples, the reference signal may be a CRS.

According to a second set of examples, a method for wireless communications is described, the method may include determining an aggregate power level for use in transmitting during one or more MBSFN transmission periods; transmitting, at a first power level, a first MBSFN transmission during a first transmission period on a base modulation layer, the first power level less than the aggregate power level; transmitting, at a second power level, a second MBSFN transmission during the first transmission period on an enhancement modulation layer that is superpositioned on the base modulation layer, the second power level being a difference between the first power level and the aggregate power level; and transmitting a reference signal for use in decoding information transmitted in at least the first MBSFN transmission, the reference signal power level corresponding to the first power level.

According to the second set of examples, an apparatus for wireless communications is described, the apparatus may include a processor, memory in electronic communication with the processor and instructions stored in the memory. The instructions may be executable by the processor to determine an aggregate power level for use in transmitting during one or more MBSFN transmission periods; transmit, at a first power level, a first MBSFN transmission during a first transmission period on a base modulation layer, the first power level less than the aggregate power level; transmit, at a second power level, a second MBSFN transmission during the first transmission period on an enhancement modulation layer that is superpositioned on the base modulation layer, the second power level being a difference between the first power level and the aggregate power level; and transmit a reference signal for use in decoding information transmitted in at least the first MBSFN transmission, the reference signal power level corresponding to the first power level.

According to the second set of examples, an apparatus for wireless communications is described, the apparatus may include means for determining an aggregate power level for use in transmitting during one or more MBSFN transmission periods; means for transmitting, at a first power level, a first MBSFN transmission during a first transmission period on a base modulation layer, the first power level less than the aggregate power level; means for transmitting, at a second power level, a second MBSFN transmission during the first transmission period on an enhancement modulation layer that is superpositioned on the base modulation layer, the second power level being a difference between the first power level and the aggregate power level; and means for transmitting a reference signal for use in decoding information transmitted in at least the first MBSFN transmission, the reference signal power level corresponding to the first power level.

According to the second set of examples, a non-transitory computer-readable medium is described, the non-transitory computer-readable medium storing code for wireless communication. The code may include instructions executable by a processor to determine an aggregate power level for use in transmitting during one or more MBSFN transmission periods; transmit, at a first power level, a first MBSFN transmission during a first transmission period on a base modulation layer, the first power level less than the aggregate power level; transmit, at a second power level, a second MBSFN transmission during the first transmission period on an enhancement modulation layer that is superpositioned on the base modulation layer, the second power level being a difference between the first power level and the aggregate power level; and transmit a reference signal for use in decoding information transmitted in at least the first MBSFN transmission, the reference signal power level corresponding to the first power level.

In some aspects of the method, apparatuses, and/or non-transitory computer-readable medium of the second set of examples, the second MBSFN transmission may be transmitted in non-overlapping resources as the reference signal.

In certain examples, the reference signal may be for use in decoding both the first MBSFN transmission and second MBSFN transmission. A traffic-to-pilot (T2P) ratio between the first power level and the reference signal power level may be, in some example, zero dB. In some examples, an indication of a ratio between the first power level and the second power level may be transmitted. In some examples, such an indication may be provided in one or more of a SIB, MIB, or during RRC signaling. In some examples, the first and second MBSFN transmissions may use a same antenna port. In other examples, the first and second MBSFN transmissions may use different antenna ports.

In certain examples, the reference signal may be for use in decoding the first MBSFN transmission, and a second reference signal may be transmitted for use in decoding the second MBSFN transmission. In some examples, the second reference signal is rate matched around transmissions of the first reference signal. In certain examples, a density of the second reference signal may be reduced relative to a density of the reference signal for use in decoding the first MBSFN transmission. In further examples, the second reference signal may be transmitted during a transmission of a base modulation layer data resource element. Additionally or alternatively, the second reference signal may be transmitted using the enhancement modulation layer during the transmission of a base modulation layer data resource element. In some examples, transmissions using the base modulation layer may use a different precoding matrix than transmissions using the enhancement modulation layer.

In some examples, one or more transmission parameters of the first MBSFN transmission may be based at least in part on a first CSI report associated with transmission resources of the base modulation layer, and one or more transmission parameters of the second MBSFN transmission may be based at least in part on a second CSI report associated with transmission resources of the enhancement modulation layer. In some examples, channel estimation for the second MBSFN transmission may be determined based at least in part on a CRS and a noise estimation for the second MBSFN transmission may be determined based at least in part on a MBSFN reference signal.

According to a third set of examples, a method for wireless communications is described, the method may include receiving a first reference signal for use in decoding information from at least a first MBSFN transmission and at least one other transmission that is concurrently transmitted with the MBSFN transmission; receiving a signal comprising a MBSFN transmission on a base modulation layer and a second transmission on an enhancement modulation layer that is superpositioned on the base modulation layer; determining that data is to be decoded from the enhancement modulation layer; performing interference mitigation on the received signal to mitigate interference from the base modulation layer based at least in part on the received first reference signal; and decoding the enhancement modulation layer based at least in part on the received first reference signal.

According to the third set of examples, an apparatus for wireless communications is described, the apparatus may include a processor, memory in electronic communication with the processor and instructions stored in the memory. The instructions may be executable by the processor to receive a first reference signal for use in decoding information from at least a first MBSFN transmission and at least one other transmission that is concurrently transmitted with the MBSFN transmission; receive a signal comprising a MBSFN transmission on a base modulation layer and a second transmission on an enhancement modulation layer that is superpositioned on the base modulation layer; determine that data is to be decoded from the enhancement modulation layer; perform interference mitigation on the received signal to mitigate interference from the base modulation layer based at least in part on the received first reference signal; and decode the enhancement modulation layer based at least in part on the received first reference signal.

According to the third set of examples, an apparatus for wireless communications is described, the apparatus may include means for receiving a first reference signal for use in decoding information from at least a first MBSFN transmission and at least one other transmission that is concurrently transmitted with the MBSFN transmission; means for receiving a signal comprising a MBSFN transmission on a base modulation layer and a second transmission on an enhancement modulation layer that is superpositioned on the base modulation layer; means for determining that data is to be decoded from the enhancement modulation layer; means for performing interference mitigation on the received signal to mitigate interference from the base modulation layer based at least in part on the received first reference signal; and means for decoding the enhancement modulation layer based at least in part on the received first reference signal.

According to the third set of examples, a non-transitory computer-readable medium is described, the non-transitory computer-readable medium storing code for wireless communication. The code may include instructions executable by a processor to receive a first reference signal for use in decoding information from at least a first MBSFN transmission and at least one other transmission that is concurrently transmitted with the MBSFN transmission; receive a signal comprising a MBSFN transmission on a base modulation layer and a second transmission on an enhancement modulation layer that is superpositioned on the base modulation layer; determine that data is to be decoded from the enhancement modulation layer; perform interference mitigation on the received signal to mitigate interference from the base modulation layer based at least in part on the received first reference signal; and decode the enhancement modulation layer based at least in part on the received first reference signal.

In some aspects of the method, apparatuses, and/or non-transitory computer-readable medium of the third set of examples, the at least one other transmission may be a unicast transmission transmitted on the enhancement modulation layer. In some examples, control signaling may be received indicating timing for receiving the first reference signal and at least a second reference signal related to the unicast transmission. The control signaling may indicate, for example, timing for transmission of at least the second reference signal. The timing, in some examples, indicates the second reference signal is to be transmitted during the MBSFN transmission on the base modulation layer. In some examples, the second reference signal may be received, and the enhancement modulation layer may be decoded based at least in part on the received first reference signal. In certain examples, the timing may indicate that at least one other reference signal is to be transmitted during the MBSFN transmission on the base modulation layer, and transmissions received when the at least one other reference signal is transmitted may be disregarded.

In certain examples, the second reference signal may be a UE-RS that is transmitted by a first transmitter on the base modulation layer concurrently with a transmission of the first reference signal that is transmitted on the base modulation layer, and the UE-RS and the first reference signal are code division multiplexed. In some examples, the first and second reference signals may be de-code division multiplexed; and the enhancement modulation layer may be decoded based at least in part on the received UE-RS. In certain examples, minimum mean squared error (MMSE) pre-processing may be performed on the received UE-RS, wide band channel estimation may be performed based on the first reference signal; the first reference signal may be cancelled to obtain the UE-RS; and a unicast channel may be estimated based at least in part on the UE-RS.

In some examples, channel estimation may be performed based on the first reference signal. In further examples, the unicast transmission may be transmitted using a set of code blocks transmitted during a first transmission period, and a data rate for each code block of the set of code blocks may be determined based at least in part on a transmission time within the first transmission period. A data rate for one or more of the code blocks spaced further in time away from the reference signal may be different than a data rate for one or more of the code blocks spaced closer in time to the reference signal, for example. In some examples, one or more other unicast transmissions may be transmitted on the base modulation layer outside of the time period for transmitting the first MBSFN transmission, channel estimation may be performed for the unicast transmission transmitted on the enhancement modulation layer based at least in part on the first reference signal, wherein the first reference signal is a CRS, and a noise estimation may be determined for the unicast transmission transmitted on the enhancement modulation layer transmission based at least in part on a MBSFN reference signal.

In certain examples, the at least one other transmission may be a second MBSFN transmission transmitted on the enhancement modulation layer. In some examples, control signaling may be received indicating that a power level of the first reference signal corresponds to a power level of the MBSFN transmission transmitted using the base modulation layer. The control signaling may include, for example, a ratio between the power level of the MBSFN transmission on the base modulation layer and a second power level of the second MBSFN transmission on the enhancement modulation layer. In some examples, the control signaling may be received in one or more of a SIB, MIB, or during RRC signaling.

In some examples, channel estimation may be performed for the second MBSFN transmission based at least in part on the first reference signal, the first reference signal may be a CRS; and a noise estimation may be determined for the second MBSFN transmission based at least in part on a MBSFN reference signal.

In some examples, each of the MBSFN transmissions may use a same antenna port. In other examples, the first and second MBSFN transmissions may use different antenna ports. In some examples, the first reference signal may is for use in decoding the base modulation layer MBSFN transmission, and a second reference signal may be received for use in decoding the second MBSFN transmission. The second reference signal may be rate matched around transmissions of the first reference signal. In some examples, a density of the second reference signal may be reduced relative to a density of the first reference signal. In certain examples, the second reference signal may be transmitted during a transmission of a base modulation layer data resource element. In some examples, the second reference signal may be received using the enhancement modulation layer during the transmission of a base modulation layer data resource element.

The described features, for example, relate to one or more improved systems, methods, and/or apparatuses for discontinuous downstream transmissions in femtocells. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
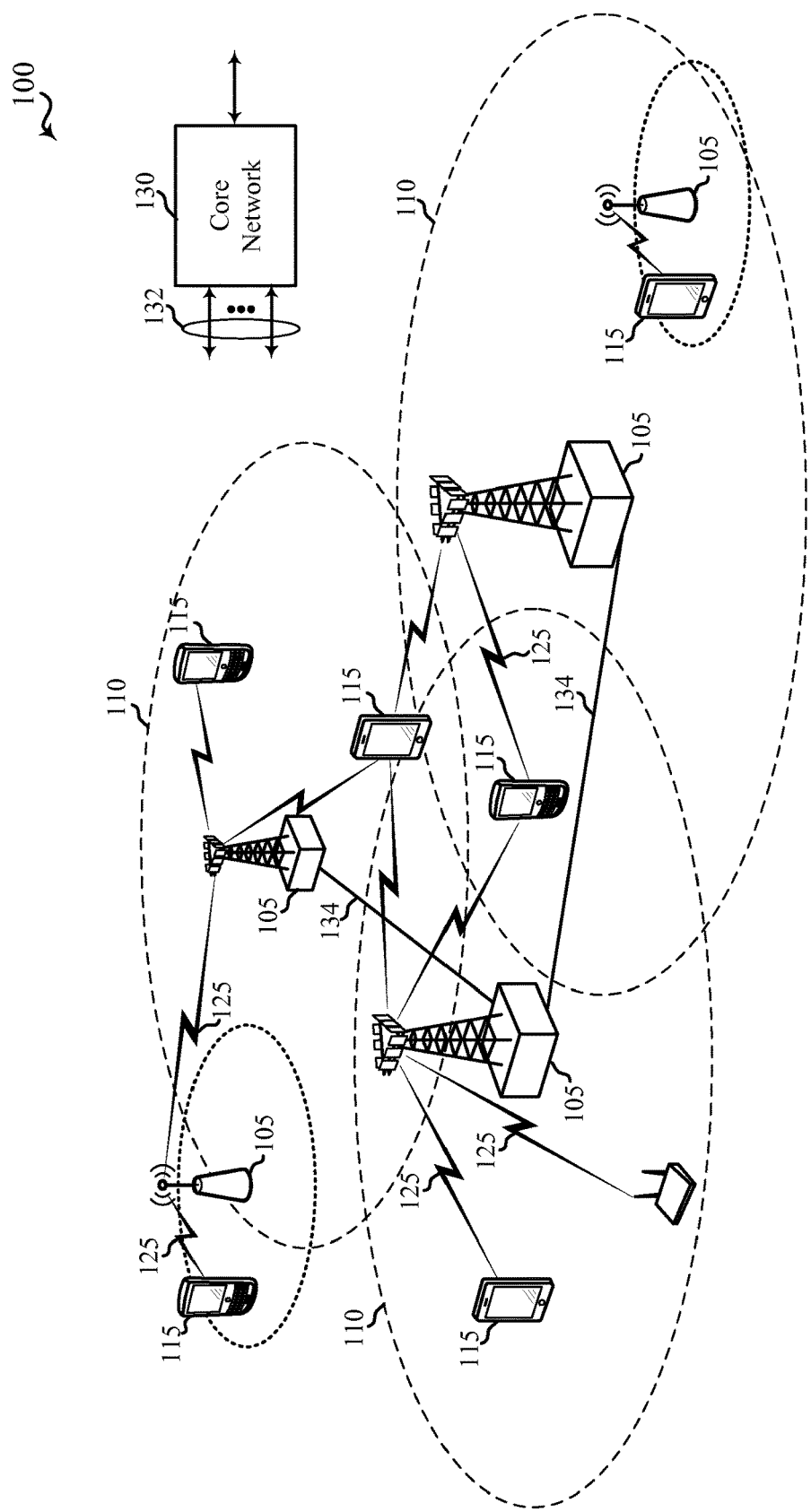
FIG. 1 is a diagram illustrating an example of a wireless communications system in accordance with various aspects of the present disclosure.

Techniques are described for hierarchical modulation during broadcast transmissions within a wireless communications system. A base station (e.g., an enhanced Node B (eNB)) and/or a user equipment (UE) may be configured to operate within the wireless communications system and may transmit/receive wireless communications on both a base modulation layer as well as on an enhancement modulation layer that is superpositioned on the base modulation layer. Thus concurrent, non-orthogonal data streams may be provided to the same or different UEs, and each modulation layer may be used to transmit content that may be selected based on particular deployments and/or channel conditions. One or more reference signals (RSs) for the enhancement modulation layer may be provided during a data resource element (RE) of a multicast broadcast single frequency network (MBSFN) transmission through, for example, puncturing the MBSFN data RE (i.e., transmitting the RS instead of data in the RE), or overlaying the RS on the MBSFN data RE (i.e., transmitting the RS on the enhancement modulation layer). In some deployments, reference signals for the enhancement modulation layer may be overlaid with MBSFN reference signals through, for example, code division multiplexing (CDM).

In certain examples, the concurrent non-orthogonal wireless communications data streams may be provided to a UE from a base station through hierarchical modulation in which first content may be selected for transmission on a base modulation layer and different content may be selected for transmission on an enhancement modulation layer. As noted above, the base modulation layer may be used to transmit broadcast data from a base station to a UE, such as an MBSFN transmission, and the enhancement modulation layer may be used to transmit other broadcast data or unicast data to UEs having channel conditions that allow reliable reception and decoding of the enhancement modulation layer. A UE receiving both the base modulation layer and the enhancement modulation layer may decode content received on the base modulation layer, and then perform interference cancellation to cancel the signal of the base modulation layer. The UE may then decode content received on the enhancement modulation layer. In some of the examples described herein, the base modulation layer may be referred to as the base layer (BL) and the enhancement modulation layer may be referred to as the enhancement layer (EL).

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The wireless communications system 100 includes base stations (or cells) 105, communication devices 115 (also referred to as UEs 115), and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a base station may be divided into sectors making up only a portion of the coverage area (not shown). The wireless communications system 100 may include base stations 105 of different types (e.g., macro and/or small cell base stations). There may be overlapping coverage areas for different technologies.

In some examples, the wireless communications system 100 is an LTE/LTE-A network that supports hierarchical modulation to provide concurrent data streams to one or more devices 115. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A small cell would generally cover a relatively smaller geographic area and may allow unrestricted access by UEs with service subscriptions with the network provider and/or restricted access by UEs having an association with the small cell (e.g., UEs in a closed subscriber group (CSG), UEs for users in the home, and the like). An eNB for a macro cell may be referred to as a macro eNB. An eNB for a small cell may be referred to as a small cell eNB, as a femto eNB or a home eNB. An eNB may support one or multiple (e.g., two, three, four, and the like) cells.

The core network 130 may communicate with the eNBs 105 via a backhaul link 132 (e.g., 51, etc.). The eNBs 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The devices 115, which may also be referred to as UEs 115, are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. According to various examples, one or both of the uplink and downlink transmissions may include multiple hierarchical modulation layers, in which one or more enhancement modulation layers may be modulated onto a base modulation layer. The base modulation layer may be decoded to obtain content modulated on the base modulation layer. The enhancement modulation layer(s) may be decoded by cancelling the base modulation layer (and other lower modulation layers if present) and decoding the resultant signal.

In some examples, one or more reference signals (RSs) for the enhancement modulation layer may be provided during a data resource element (RE) of a broadcast transmission, such as an MBSFN transmission through, for example, puncturing the MBSFN data RE (i.e., transmitting the RS instead of data in the RE), or overlaying the RS on the MBSFN data RE (i.e., transmitting the RS on the enhancement modulation layer). In some deployments, reference signals for the enhancement modulation layer may be overlaid with MBSFN reference signals through, for example, code division multiplexing (CDM). Additional details regarding the implementation of hierarchical modulation and associated reference signals that may be used for decoding enhancement modulation layer transmissions in a system such as the wireless communications system 100, as well as other features and functions related to the operation of such a system, are provided below with reference to FIGS. 2-23.

Figure 2:
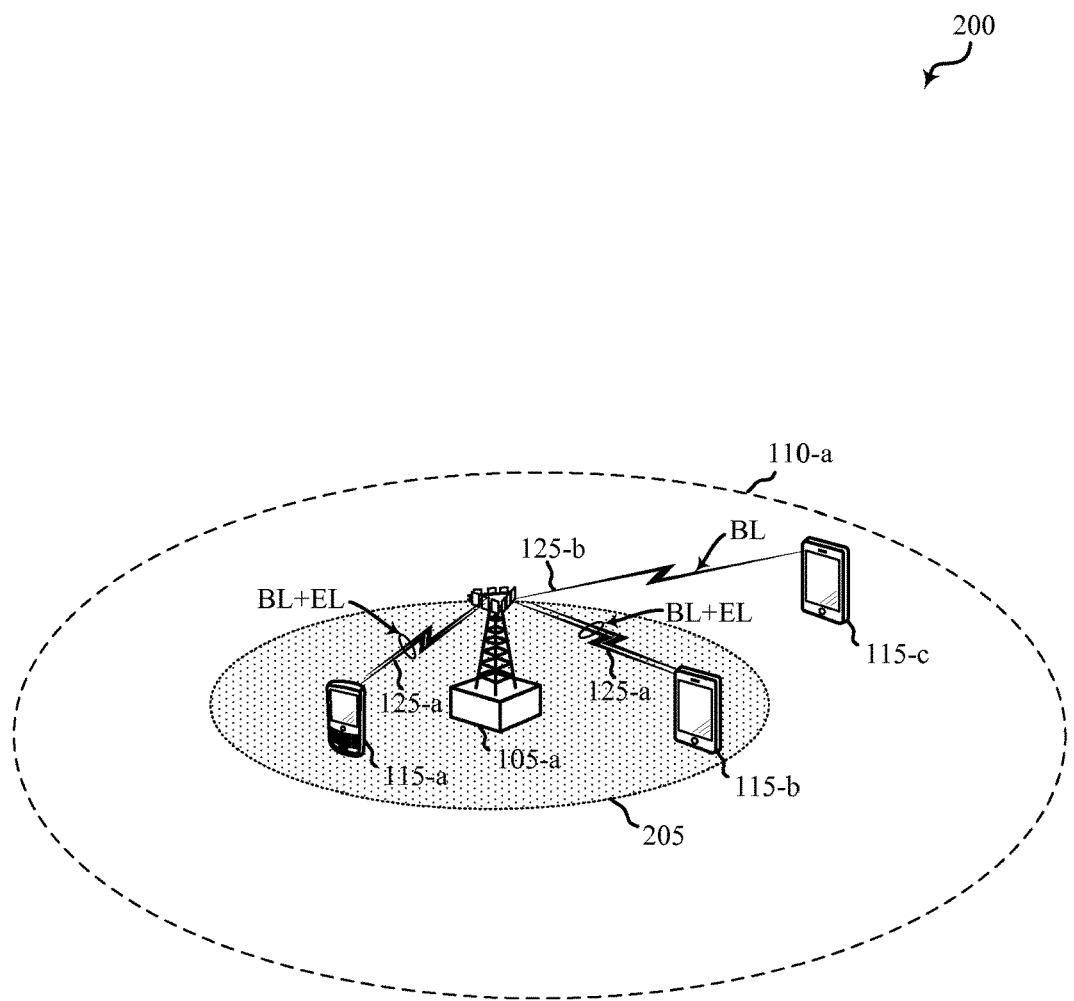
FIG. 2 illustrates a hierarchical modulation environment in accordance with various aspects of the present disclosure.

FIG. 2 illustrates a system 200 in which a base station 105-*a* may communicate with one or more UEs 115 using hierarchical modulation. System 200 may illustrate, for example, aspects of wireless communication system 100 illustrated in FIG. 1. In the example of FIG. 2, a base station 105-*a* may communicate with a number of UEs 115-*a*, 115-*b*, and 115-*c* within a geographic coverage area 110-*a* of the base station 105-*a*. In this example, multiple modulation layers may be employed for wireless communications, in which a base modulation layer and one or more enhancement modulation layers may be concurrently transmitted between the base station 105-*a* and the UEs 115. The base modulation layer, according to various examples, may provide broadcast transmissions having relatively high reliability communications between the base station 105-*a* and UEs 115, resulting in a higher likelihood that the UEs 115 within the geographic coverage area 110-*a* will be able to decode content transmitted on the base modulation layer. The enhancement modulation layer, according to various examples, may provide relatively lower reliability communications between the base station 105-*a* and UEs 115 as compared to the base modulation layer. As such, transmissions on the enhancement modulation layer, in order to have reliable reception and decoding, may be provided to UEs 115 having relatively good channel conditions.

As mentioned, the enhancement modulation layer may have a lower likelihood of successful reception relative to the base modulation layer, with the likelihood of successful reception largely dependent upon channel conditions between the base station 105-*a* and UEs 115. In some deployments, such as illustrated in FIG. 2, UEs 115-*a* and 115-*b* may be located relatively close to base station 105-*a* in area 205, while UE 115-*c* may be located closer to a cell edge of the base station 105-*a* geographic coverage area 110-*a*. If it is determined that UEs 115-*a* and 115-*b* located in area 205 have channel conditions conducive to hierarchical modulation, base station 105-*a* may signal to the UEs 115-*a* and 115-*b* that such communications may be employed. In such cases, communication links 125-*a* may include both a base modulation layer and an enhancement modulation layer, and UEs 115-*a* and 115-*b* may support communications on each of the hierarchical modulation layers. In this example, UE 115-*c*, located closer to the cell edge of geographic coverage area 110-*a*, and outside of area 205, may be signaled to communicate using only the base modulation layer in communication link 125-*b*. While the communication link 125-*b* may still be transmitted with both the base and enhancement modulation layers, UE 115-*c* may not attempt to decode the enhancement modulation layer due to the relatively low likelihood of successful reception and decoding of content modulated on the enhancement modulation layer. In other examples, one or more of the UEs 115 may not have the capability to receive and decode enhancement modulation layer transmissions, in which case the base modulation layer is simply received and decoded according to established techniques.

In examples where the base modulation layer includes a broadcast transmission, such as a MBSFN transmission, a set of subframes may be reserved across multiple base stations 105 in a wireless communications system (e.g., wireless communications system 100 of FIG. 1) for MBSFN transmission, and the MBSFN transmission is over the entire band during the reserved subframes. The MBSFN transmissions are designed to have close to complete coverage throughout the geographic coverage area 110-*a* of the associated base station 105-*a*, and the data rate in such transmissions may be relatively conservative in order to provide a high likelihood that even UEs 115 having relatively poor channel conditions, such as UE 115-*c* located close to an edge of the geographic coverage area 110-*a* in FIG. 2, may still receive and decode the MBSFN transmissions. As a result, if the MBSFN coverage is targeting for 95% users, it is likely that significant portion of UEs 115 within the coverage area for the base station 105-*a* have a signal to noise ratio (SNR) more than sufficient to reliably receive and decode the MBSFN transmissions.

Various examples may take advantage of this situation, and may borrow some power from the MBSFN transmissions to transmit unicast or another MBSFN service with smaller coverage area 205. According to some examples, MBSFN transmissions may be transmitted using an extended cyclic prefix (CP), while unicast transmissions may be broadcast using a normal CP. In examples in which unicast data is transmitted using the enhancement modulation layer, such unicast data may also be transmitted using the same numerology as the base modulation layer. For example, a unicast enhancement layer transmission may use an extended CP to match the extended CP of the MBSFN transmission on the base modulation layer.

In some examples, some power from the MBSFN base modulation layer transmissions may be used to transmit the enhancement modulation layer, thus adding capacity of the additional layer at the cost of a relatively small reduction of base modulation layer MBSFN coverage. The enhancement modulation layer, as mentioned above, may include other broadcast transmissions to multiple UEs 115, or unicast transmissions to a specific UE 115. For example, base station 105-*a* may schedule unicast transmissions to UEs 115-*a* and 115-*b* that have relatively good channel conditions. The favorable channel conditions at UEs 115-*a* and 115-*b* provide a MBSFN signal having a relatively high SNR and can be cancelled in order to obtain the enhancement modulation layer transmission. The base modulation layer may be cancelled using one or more established interference cancellation techniques, such as, for example, codeword interference cancellation (CWIC) or symbol level interference cancellation (SLIC). Thus, for high geometry UEs 115-*a* and 115-*b*, relatively small unicast power on the enhancement modulation layer can support reasonably high data rate. Furthermore, in some deployments, the coverage for MBSFN transmissions may be adjusted based on the desired capacity for the enhancement modulation layer.

While various examples describe MBSFN transmissions using the base modulation layer, techniques described herein may also be employed in deployments in which the base modulation layer may be used to transmit one or more other transmissions, such as, for example, transmissions of a UE reference signal-based physical downlink control channel (PDCCH or ePDCCH), a physical downlink shared channel (PDSCH), a physical multicast channel (PMCH), or high priority data. In examples, the enhancement modulation layer may be used to transmit one or more of a UE reference signal-based physical downlink shared channel (PDSCH or ePDSCH), a PMCH, or another MBSFN transmission.

In examples where the enhancement modulation layer is used to transmit MBSFN transmissions, the enhancement modulation layer transmissions may provide, for example, higher resolution for UEs 115 in smaller coverage area 205 to supplement the resolution provided in the base modulation layer transmissions, or the enhancement modulation layer transmissions may provide extra channels for UEs 115 located within smaller coverage area 205. The base and enhancement modulation layers may use a shared antenna port, or separate antenna ports. In some examples, as discussed in more detail below, backward compatibility for UEs 115 that may not be capable of receiving and decoding the enhancement modulation layer transmissions may be maintained through adjustments to the power level of one or more RSs associated with the MBSFN transmissions on the base modulation layer.

In examples where the enhancement modulation layer is used to transmit unicast data transmissions, such transmissions may be employed when some amount of MBSFN coverage can be sacrificed for unicast capacity. The base and enhancement layer transmissions in such cases are effectively not on the same antenna port, and reference signals for use in receiving and decoding the enhancement modulation layer transmissions may be provided. As will be described in more detail below, such reference signals may include a UE specific reference signal (UE-RS) that punctures one or more MBSFN data REs, a UE-RS overlaid with one or more MBSFN data REs, a UE-RS overlaid with a MBSFN-RS, a UE-RS transmitted in dedicated resources within a subframe, a UE-RS transmitted in shared resources within a subframe, or common reference signal (CRS) based reference signals.

Figure 3:
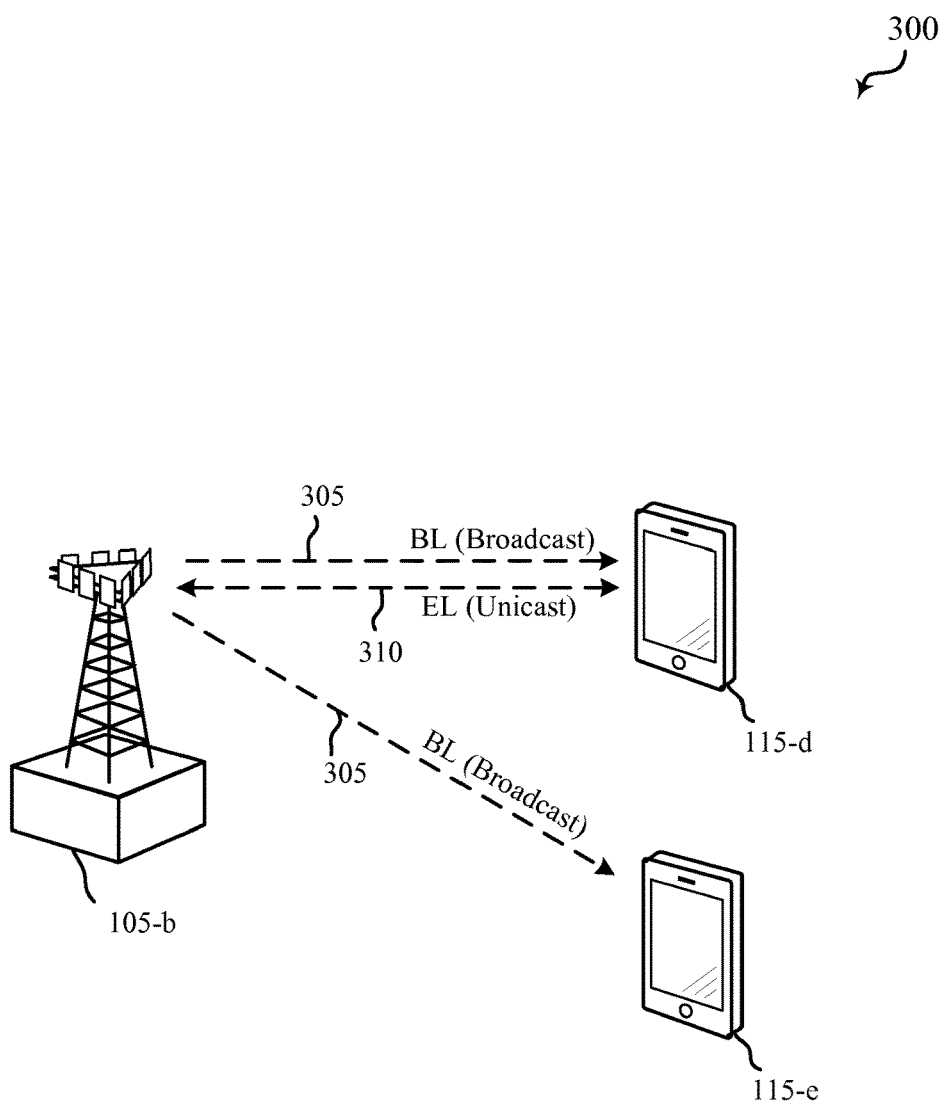
FIG. 3 illustrates a hierarchical modulation environment in accordance with various aspects of the present disclosure.

With reference now to FIG. 3 a system 300 is illustrated in which an base station 105-*b* may be in communication with UE 115-*d* and UE 115-*e* using hierarchical modulation. System 300 may illustrate, for example, aspects of wireless communications systems 100 and/or 200 illustrated in FIGS. 1 and/or 2. In this example, similarly as above, multiple modulation layers may be employed for wireless communications, in which a base modulation layer 305 and an enhancement modulation layer 310 may be concurrently transmitted between the base station 105-*b* and the UEs 115-*d* and 115-*e*. In this example, base modulation layer 305 may include broadcast data, such an MBSFN transmissions, transmitted to multiple different UEs, such as UE 115-*d* and UE 115-*e*.

The enhancement modulation layer 310, in this example, may be superpositioned on the base modulation layer 305 and include unicast data for UE 115-*d*. The enhancement modulation layer and base modulation layer may be transmitted in a single communications link between base station 105-*b* to UE 115-*d*. In this example, even though UE 115-*e* may have sufficient channel quality and capability to receive and decode the enhancement modulation layer 310, the UE 115-*e* may disregard the enhancement modulation layer 310 based on the enhancement modulation layer 310 not including content for UE 115-*e*. In some examples, the base station 105-*b* may provide signaling to UEs 115-*d* and 115-*e* indicating that the first UE 115-*d* is scheduled to receive unicast data via the enhancement modulation layer 310. The second UE 115-*e*, having not received a downlink grant on the enhancement modulation layer 310, may thus ignore the enhancement modulation layer 310 and only decode information contained in the base modulation layer 305.

In some examples, the broadcast data provided on the base modulation layer 305 may be MBSFN content transmitted using a physical multicast channel (PMCH), and the unicast data provided on the enhancement modulation layer may be transmitted using a PDSCH. The UEs 115-*d* and 115-*e*, in certain examples, receive the broadcast data on the base modulation layer and do not transmit an acknowledgment of receipt of the broadcast data. The UE 115-*e* that receives the unicast data via the enhancement modulation layer 310, in examples, may perform hybrid automatic repeat request (HARM) techniques on the received unicast data and transmit an ACK/NACK of receipt of the unicast data. UE reference signals (UE-RS) for use in receiving and decoding the unicast transmissions on the enhancement modulation layer 310 may be provided according to one or more techniques discussed below with respect to FIGS. 4-9. The UE-RS may be used, in conjunction with one or more MBSFN-RS to receive and decode both the MBSFN transmissions on the base modulation layer 305 and the unicast transmissions on the enhancement modulation layer 310 during a particular transmission period, such as a subframe of a radio frame transmitted according to established transmission techniques in the wireless communications system 300. Thus, the base station 105-*b* may transmit the MBSFN transmission during a first transmission period on the base modulation layer 305, and transmit the unicast transmission during the first transmission period on the enhancement modulation layer 310 that is superpositioned on the base modulation layer 305. The UE-RS for use in decoding information transmitted in the unicast transmission on the enhancement modulation layer 310 is also transmitted during the first transmission period. In some examples, base station 105-*b* may transmit timing information indicating when the UE-RS is to be transmitted. The timing information may be provided in, for example, one or more of a system information block (SIB), master information block (MIB), or during radio resource control (RRC) signaling.

Figure 4:
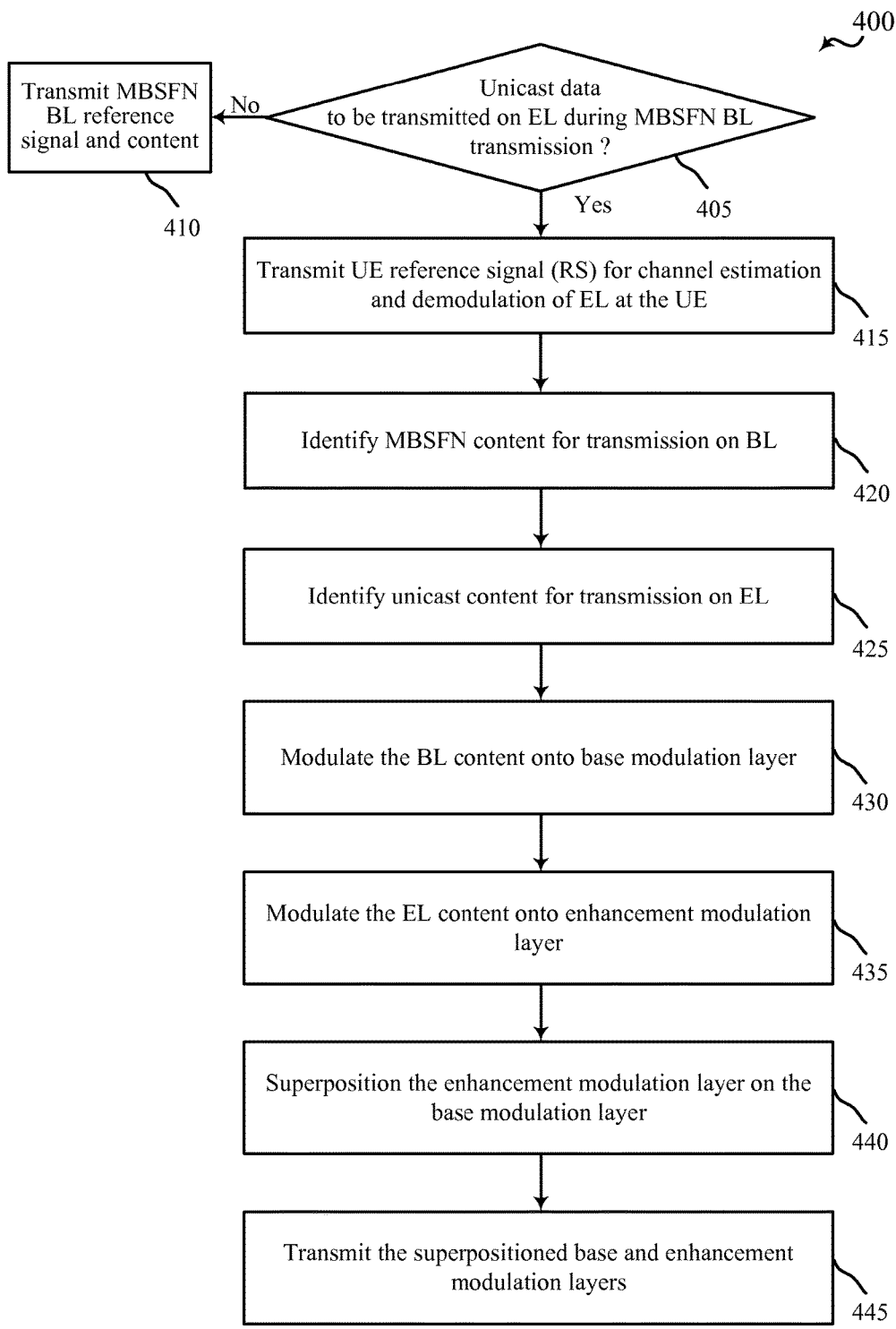
FIG. 4 is a flowchart of a method for hierarchical modulation of content in a base station according to various aspects of the present disclosure.

With reference now to FIG. 4, a flowchart conceptually illustrating an example of a method of wireless communication is described in accordance with aspects of the present disclosure. For clarity, the method 400 is described below with reference to ones of the base stations 105 described with reference to FIGS. 1, 2, and/or 3. In one example, a base station may execute one or more sets of codes to control the functional elements of the base station or device to perform the functions described below.

At block 405, the base station may determine whether unicast data is to be transmitted on an enhancement layer (EL) during a MBSFN base layer (BL) transmission. As mentioned above, the base station may determine that a particular UE has the capability to receive enhancement layer transmissions and has sufficient channel conditions to receive unicast transmissions using the enhancement modulation layer. In some examples, a UE may provide an indication of the capability to support MBSFN and unicast transmissions using hierarchical modulation. A UE, in certain examples, may UE may also indicate a duty cycle of this support, which may be based on processing resources available at the UE which may not allow for reception and decoding of multiple modulation layers in adjacent subframes. The base station, in some examples, may indicate the capability to support hierarchical modulation in the SIB, and UEs may avoid monitoring unicast overlay related downlink control information (DCI). In other examples, a base station may not broadcast the hierarchical modulation capability, but just schedule unicast overlay to UEs with the capability to receive multiple modulation layers. In such cases, a UE may always monitor the unicast overlay related DCI. In further examples, the base station may indicate the subframes supporting the unicast overlay, in which case UEs do not need to detect the unicast overlay DCI in other subframes. Within the unicast overlay DCI, the base station may also provide, in some examples, a traffic to pilot ratio (TPR) for MBSFN (if Quadrature Phase Shift Keying (QPSK) is employed), and also the TPR for the unicast transmission which can be potentially different from a TPR for unicast transmissions on the base modulation layer.

If it is determined at block 405 that no unicast data is to be transmitted on the enhancement layer, the base station may transmit MBSFN transmissions, including MBSFN RS and content, using the base modulation layer, as indicated at block 410. If it is determined that unicast data is to be transmitted to the UE using the enhancement layer, the base station, at block 415, may transmit one or more UE-RS for channel estimation and demodulation of the enhancement layer transmission at the UE. In some examples, the base station may provide one or more downlink grants to the UE to receive unicast transmissions on the enhancement modulation layer. The base station may also, in examples, provide one or more of a transmission energy ratio between the base and enhancement modulation layers, a transport block size for the enhancement modulation layer, or a code rate for the enhancement modulation layer. In certain examples, the downlink grant may include one or a combination of a resource block location of data transmitted to the UE on the enhancement modulation layer, a modulation and coding scheme (MCS) of the unicast data transmitted to the UE on the enhancement modulation layer, a precoding matrix used for transmitting on the enhancement modulation layer, code block size for the enhancement modulation layer, and/or a number of spatial layers for the enhancement modulation layer. Furthermore, although various examples described herein reference a single enhancement modulation layer, the techniques may also be used on multiple enhancement layers.

The signaling information, in some examples, may be provided in a single downlink grant comprising information for the enhancement modulation layer provided to each UE that is to receive the unicast transmissions on the enhancement layer. In other examples, all of a portion of the signaling information may be provided using radio resource control (RRC) signaling, which may include, for example, the energy ratio between the base modulation layer and enhancement modulation layer, a modulation scheme for the enhancement modulation layer, or a resource block size for the enhancement modulation layer. In such examples, the parameters provided in the RRC signaling may be semi-statically configured, and downlink grants may be based on such semi-statically configured parameters. In some examples, the signaling information is provided using a physical control format indicator channel (PCFICH).

With continued reference to FIG. 4, at block 420, the base station may identify MBSFN content for transmission on the base modulation layer. The MBSFN content may be, for example, streaming data such as voice and/or video data provided to multiple UEs located within a coverage area of the base station. At block 425, the base station may identify unicast data for transmission on the enhancement modulation layer. At block 430, the base station may modulate the base layer content onto base modulation layer. The base modulation layer content may be modulated onto the base modulation layer according to the parameters associated with the MBSFN transmissions on the base modulation layer. At block 435, the base station may modulate enhancement layer content onto enhancement modulation layer in a similar manner. At block 440, the base station may superposition the enhancement modulation layer on the base modulation layer. At block 445, the base station may transmit the superpositioned base modulation layer and enhancement modulation layer to the one or more UEs.

Figure 5:
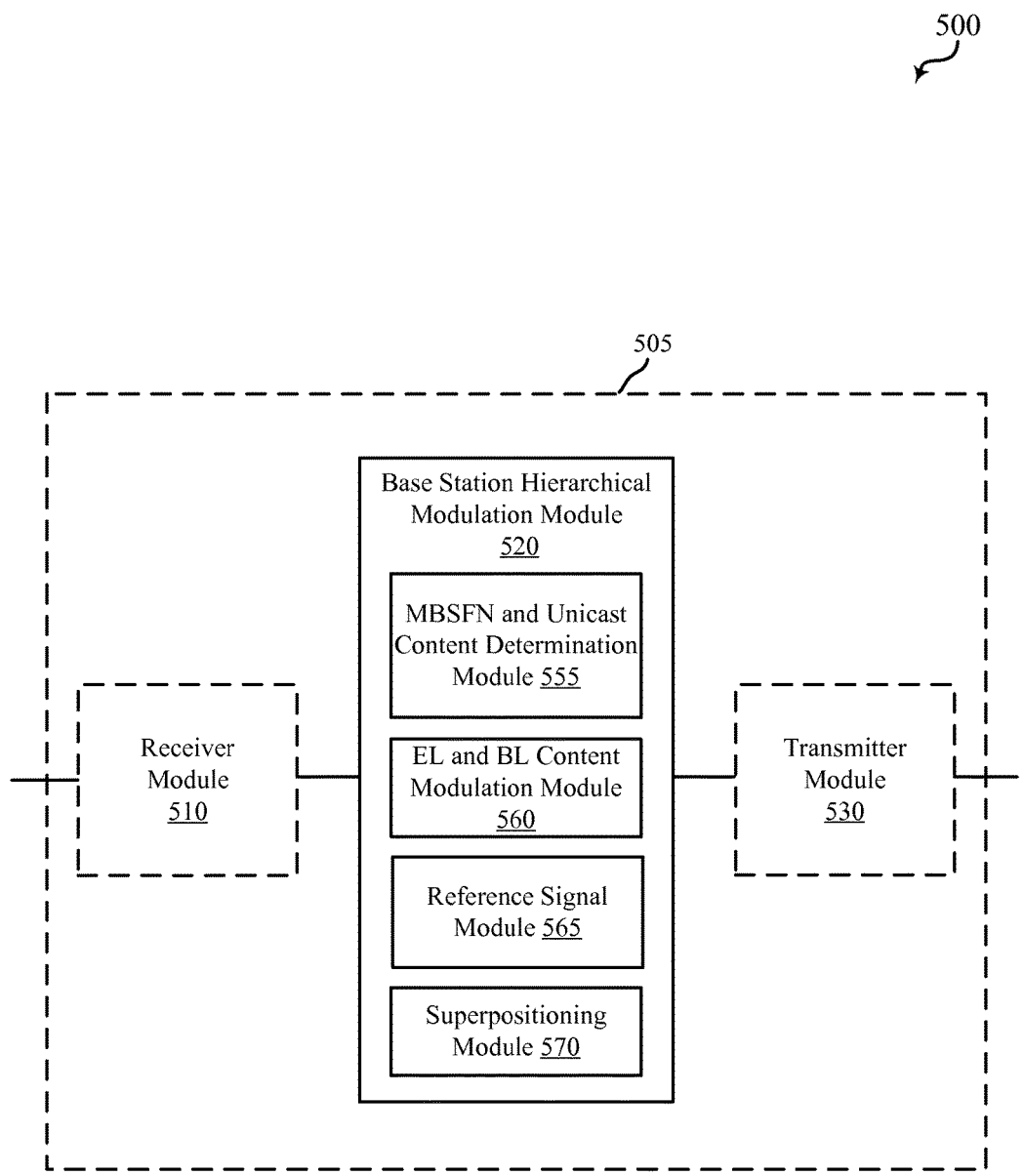
FIG. 5 shows a block diagram of a device that may be used for hierarchical modulation in accordance with various aspects of the present disclosure.

FIG. 5 is a block diagram 500 conceptually illustrating a device 505, such as a base station, for use in wireless communications in accordance with aspects of the present disclosure. In some examples, the device 505 may be an example of one or more aspects of the base stations 105 described with reference to FIGS. 1, 2, and/or 3. The device 505 may also be a processor. The device 505 may include a receiver module 510, a base station hierarchical modulation module 520, and/or a transmitter module 530. Each of these components may be in communication with each other.

The components of the device 505 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 510 may be or include a radio frequency (RF) receiver, such as an RF receiver operable to receive transmissions on two or more hierarchical modulation layers. The receiver module 510 may be used to receive various types of data and/or control signals (i.e., transmissions) over one or more communication links of a wireless communications system, such as one or more communication links 125 of the wireless communications systems 100, 200, and/or 300 described with reference to FIGS. 1, 2, and/or 3.

In some examples, the transmitter module 530 may be or include an RF transmitter, such as an RF transmitter operable to transmit on two or more hierarchical modulation layers (e.g., through a base modulation layer and one or more enhancement modulation layers). The transmitter module 530 may be used to transmit various types of data and/or control signals (i.e., transmissions) over one or more communication links of a wireless communications system, such as one or more communication links 125 of the wireless communications systems 100, 200, and/or 300 described with reference to FIGS. 1, 2, and/or 3.

In some examples, the base station hierarchical modulation module 520 may configure multiple hierarchical modulation layers and determine content to be transmitted on each hierarchical modulation layer for device 505 when operating in a wireless communications system supporting transmissions on two or more hierarchical modulation layers. The base station hierarchical modulation module 520 may, for example, configure device 505 to determine content for transmission on each hierarchical modulation layer, modulation of the content on each hierarchical modulation layer, and superpositioning of the hierarchical modulation layers for transmission through transmitter module 530, such as described above with respect to FIGS. 1-4, for example, and as will be described below for various examples in FIGS. 6-23.

In some examples, base station hierarchical modulation module 520 may include MBSFN and unicast content determination module 555, enhancement layer and base layer content modulation module 560, reference signal module 565, and superpositioning module 570. The MBSFN and unicast content determination module 555 may determine content that is to be transmitted from the device 505 using the base modulation layer and content that is to be transmitted from the device 505 using the enhancement modulation layer, such as described above with respect to FIGS. 1-4, for example. The enhancement layer and base layer content modulation module 560 may modulate the determined content onto the appropriate base or enhancement modulation layers. The reference signal module 565 may determine one or more of various reference signals to be transmitted for the base and enhancement modulation layers for use by a UE in receiving and decoding the base and enhancement layer transmissions. The superpositioning module 570 may superposition the modulated enhancement modulation layer onto the base modulation layer for transmission by the transmitter module 530.

In certain examples, the MBSFN and unicast content determination module 555 may determine that a UE is to receive transmissions on base and enhancement modulation layers based on channel state information associated with the UE. The MBSFN and unicast content determination module 555 may determine CSI for a number of UEs and determine which of the UEs are to receive one or more of the base or enhancement modulation layers based on the CSI for each of the UEs. For example, one or more UEs determined to have lower channel quality based on the determined CSI may receive the base modulation layer, and one or more UEs determined to have higher channel quality based on the determined CSI may receive the enhancement modulation layer or both the base and enhancement layers, depending upon the content that is to be transmitted to the UEs. For unicast channel quality indicator (CQI) computation, the MBSFN and unicast content determination module 555 may assume the MBSFN data can be cancelled. For CQI computation, channel may be estimated using CRS, noise can be estimated using MBSFN-RS. The superpositioning module 570 may superposition the enhancement modulation layer onto the base modulation layer according to parameters for transmission by transmitter module 530.

Figure 6:
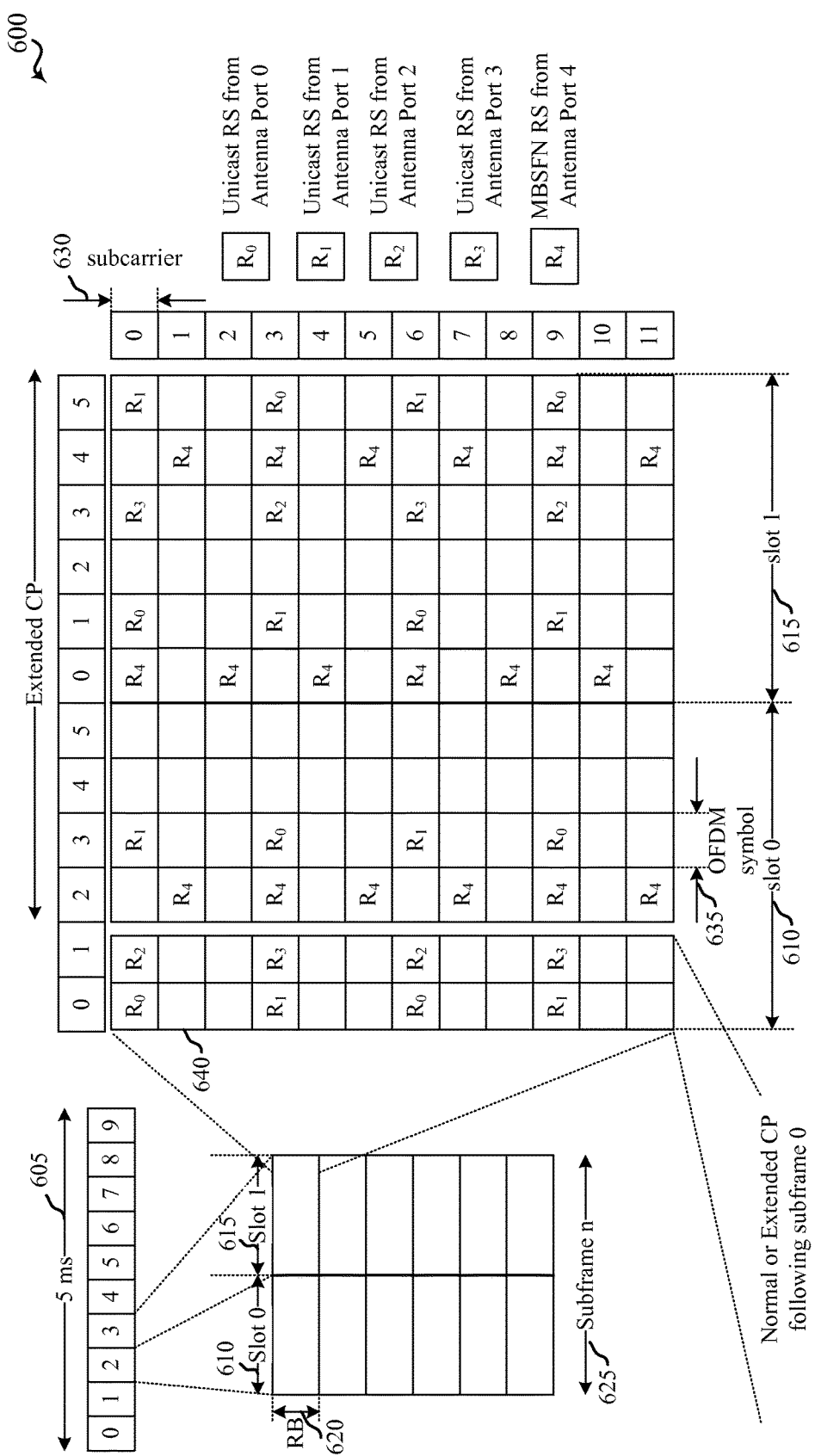
FIG. 6 is an illustration of reference signal locations for enhancement layer unicast and base layer multicast broadcast single frequency network (MBSFN) reference signals in accordance with various aspects of the present disclosure.

As discussed above, one or more reference signals may be transmitted for use in receiving and decoding the enhancement modulation layer. The enhancement modulation layer RSs, in some examples, may be provided during a data RE of a MBSFN transmission through, for example, puncturing the MBSFN data RE (i.e., transmitting the RS instead of data in the RE), or overlaying the RS on the MBSFN data RE (i.e., transmitting the RS on the enhancement modulation layer). FIG. 6 provides an illustration of transmission resources 600 including indications of particular resources used for various reference signals. In this example, a first half of a radio frame 605 is illustrated having a number of numbered slots of a radio frame. Each subframe 625 of the radio frame 605 includes two slots, including slot 0 610 and slot 1 615. Each slot is 0.5 ms, and includes a number of resource blocks (RBs) 620. Within a resource block 620, a number of resource elements 640 are defined by a subcarrier 630 and OFDM symbol 635. In transmissions using an extended cyclic prefix (CP), there are six OFDM symbols in each slot, as illustrated in FIG. 6. Reference signals occupy some of the resource elements (REs) 640, and may include four unicast reference signals (UE-RSs) $R_0$, $R_1$, $R_2$, and $R_3$, which correspond to unicast RS for antenna ports 0-4, respectively. Further, an MBSFN RS, $R_4$, is provided in resource elements. In traditional MBSFN transmissions, only $R_4$ is transmitted following the first two symbols of the first slot 610.

In the example of FIG. 6, the unicast signal on the enhancement layer is transmitted using a UE-RS $R_0$, $R_1$, $R_2$, and/or $R_3$ similar to an established UE-RS on port 7/8. Additionally, when unicast data is transmitted on the enhancement modulation layer, the data is transmitted using rate matching around the MBSFN-RS $R_4$. This may be performed because the MBSFN channel potentially is very frequency selective due to large delay spread, resulting in a relatively low amount of processing gain to clean up the interference introduced by enhancement layer data on RS tones, and the residual noise will be counted as channel. Likely this residual will be the same level as enhancement layer energy, and after base layer decoding, the data REs are reconstructed by multiplying with the estimated channel. The reconstructed samples may then have noise at the same level as channel estimation noise, with noise level around the same as the enhancement layer energy. Then, after the cancellation of the base layer, the UE-RS would have a large residual error and the channel estimation for enhancement layer may be problematic. Thus, rate matching of the enhancement layer around the MBSFN-RS $R_4$ may be performed to provide a cleaner channel estimation.

As indicated in FIG. 6, the UE-RS $R_0$ through $R_3$, may puncture MBSFN data, and provide a cleaner unicast channel estimation. In some examples, all base stations transmitting the MBSFN transmissions may puncture potential UE-RS locations, no matter if the cell is transmitting unicast or not, so as to provide consistent transmissions. For example, if only a subset of MBSFN cells punctures at a UE-RS location, the MBSFN channel at these REs are different from the MBSFN channel at MBSFN-RS, and a UE may not be able to reconstruct the MBSFN data at these REs for cancellation. In some examples, timing for the UE-RS are provided and UEs that are not receiving unicast data on the enhancement layer may disregard the transmissions at the UE-RS locations. In cases where a UE is not capable of receiving hierarchical transmissions or is not capable of receiving signaling indicating the timing of the UE-RS, the UE may attempt to decode the UE-RS locations as MBSFN data and thus a slight performance reduction may be seen for such UEs. Such puncturing may provide a clean RS for MBSFN and unicast transmissions on the base and enhancement layers, and UEs can estimate the channels separately. As mentioned, UEs not capable of hierarchical modulation may treat the unicast data overlay and MBSFN data puncturing as interference, while a hierarchical modulation enabled UE may skip MBSFN data puncturing REs, and use unicast channel and modulation order information for base layer demodulation (e.g., by Log-likelihood ratio (LLR) computation), may perform data interference cancellation of the base layer, and then decode the enhancement layer.

In other examples, rather than puncturing the MBSFN data REs with UE-RS $R_0$ through $R_4$, the UE-RS $R_0$-$R_4$ may be overlaid with the MBSFN data REs by transmitting the UE-RS on the enhancement layer. In such examples, a legacy UE without capability for hierarchical modulation may see some performance loss due to interference level mismatch in resource elements in which the UE-RS $R_0$-$R_4$ overlays on top of MBSFN data, and a UE with hierarchical modulation capability may perform enhancement layer channel estimation after MBSFN data interference cancellation. Thus, a legacy UE may have slightly degraded performance but MBSFN data may still be decoded from the REs containing the UE-RS $R_0$-$R_4$. The UE-RS $R_0$-$R_4$ may be overlaid on the MBSFN REs at the same locations as illustrated in FIG. 6. A UE with hierarchical modulation capability may then decode the MBSFN data and perform interference cancellation to cancel out the base modulation layer, and the result is then a clean UE-RS $R_0$-$R_4$ that may be used to perform channel estimation for the enhancement layer, and receive and decode the enhancement modulation layer transmissions.

In still further examples, channel estimation for the unicast transmissions on the enhancement modulation layer may be based on CRS that is frequency division multiplexed (FDM) with MBSFN-RS. In such examples, the base station may indicate precoding used in the associated transmissions, such as in information provided in a downlink resource grant. The MBSFN data REs may be punctured to transmit the CRS, which may occupy resource elements indicated in FIG. 6 for the UE-RS signals $R_0$-$R_4$, for example. Similarly as discussed above when the UE-RS punctured the MBSFN data REs, a legacy UE may experience additional interference from such puncturing. In certain examples, the MBSFN-RS is not changed, and channel estimation of the enhancement layer using CRS is performed in a similar manner as established channel estimation based on CRS.

Figure 7:
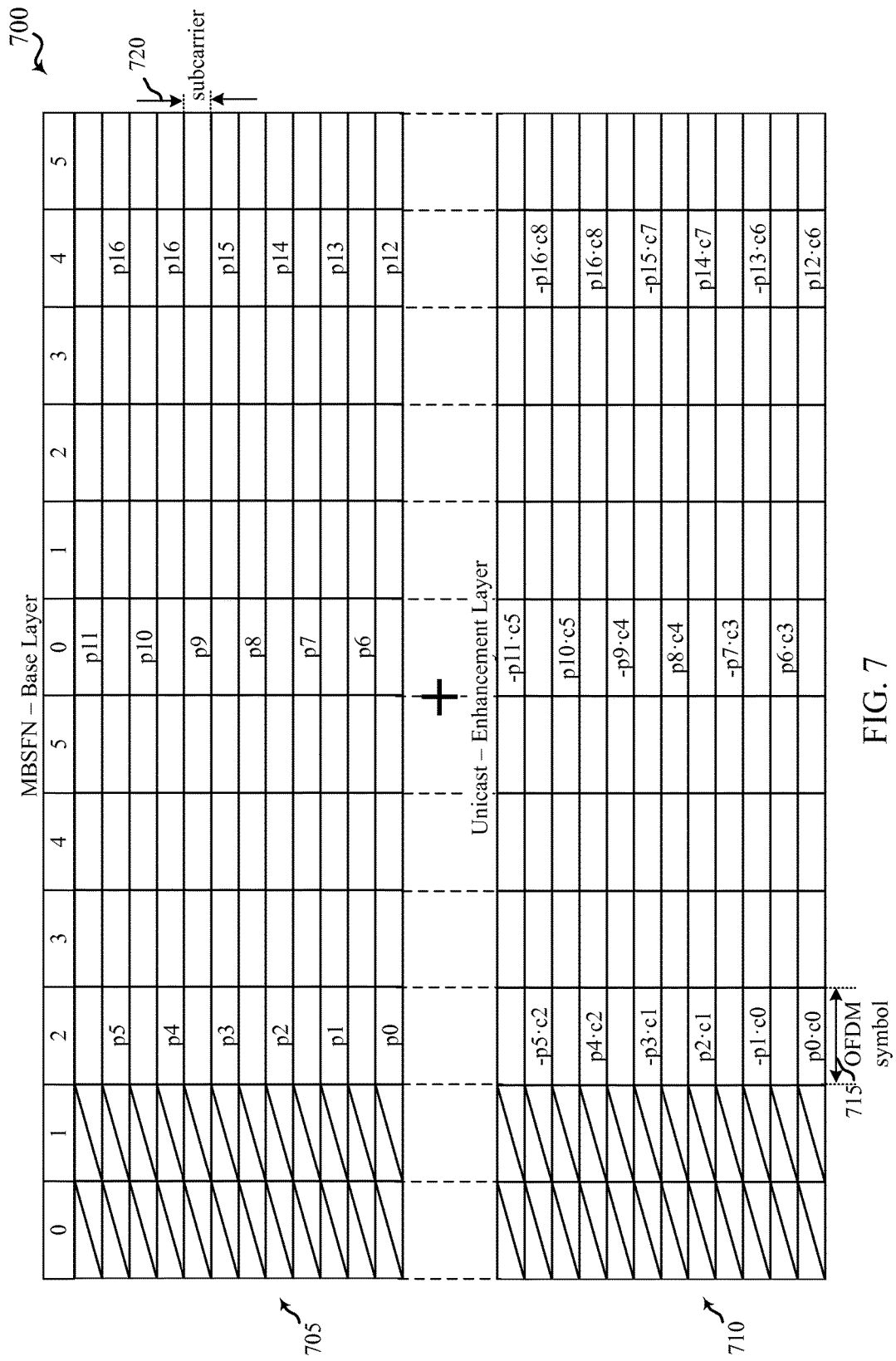
FIG. 7 is an illustration of reference signal locations for code division multiplexed enhancement layer unicast and base layer MBSFN reference signals in accordance with various aspects of the present disclosure.

While the examples of FIG. 6 may provide reference signals that either puncture or overlay with MBSFN data REs, other examples may provide a UE-RS that is overlaid with the MBSFN-RS. FIG. 7 illustrates an example 700 of a UE-RS that is overlaid with the MBSFN-RS in MBSFN base layer transmissions 705 and unicast enhancement layer transmissions 710. MBSFN base layer transmissions 705 and unicast enhancement layer transmissions 710 may be part of subframe transmissions such as described with respect to FIG. 6, in which slots within a subframe have OFDM symbols 715 and resource elements are defined by the OFDM symbol 715 and a subcarrier 720. In this example, the base layer transmissions 705 may be transmitted having MBSFN-RS locations as indicated at p0-p16.

The unicast enhancement layer may include UE-RSs that are orthogonal to the MBSFN-RS in code domain (similar to port 7/8 RS in traditional LTE transmissions). That is, the UE-RSs are code division multiplexed (CDM) with the MBSFN-RS p0-p16. The MBSFN-RS p0-p16 is MBSFN cell specific. In certain examples, each even and odd MBSFN RS p0-p16 are treated as a pair, say (p0, p1 . . . p15, p16), and the channel may be assumed to be constant across these two REs associated with the even and odd RS pair. Then for each MBSFN-RS pair, the same two symbols may be used for transmitting UE-RS with an introduced (1, −1) pattern in the enhancement layer transmission 710. In addition, in the example of FIG. 7, another per cell specific scrambling is added on each pair (c0, c1, . . . c8), thus providing two rounds of scrambling for the UE-RS. A receiver may perform de-CDM in an established manner, such as similar manner as performed for port 7/8 UE-RS in traditional LTE. While a single enhancement layer is discussed in various examples, such techniques may be extended to have two or more unicast layers with $(1, e^{j2\pi/3}, e^{j4\pi/3})$ and $(1, e^{j4\pi/3}, e^{j2\pi/3})$ CDM transmitted in multiple hierarchical layers.

Channel estimation for the MBSFN channel and the unicast channel may be performed by estimating the MBSFN channel treating UE-RS as noise, cancelling the MBSFN-RS, and re-estimating to obtain the UE-RS channel. In some examples, the receiver may do minimum mean squared error (MMSE) based pre-processing before MBSFN channel estimation, the MMSE based over each RS pair. Such MMSE pre-processing may factor in that the MBSFN-RS is designed for a highly frequency selective channel, while the unicast UE-RS has a flatter channel relative to frequency. The MBSFN-RS may be used for wide band channel estimation of the base modulation layer. Then, the MBSFN may be reconstructed and cancelled (e.g., using SLIC or CWIC) to obtain the unicast channel transmitted on the enhancement modulation layer. The UE-RS may be demapped and decoded, and used for channel estimation of the enhancement modulation layer.

Figure 8:
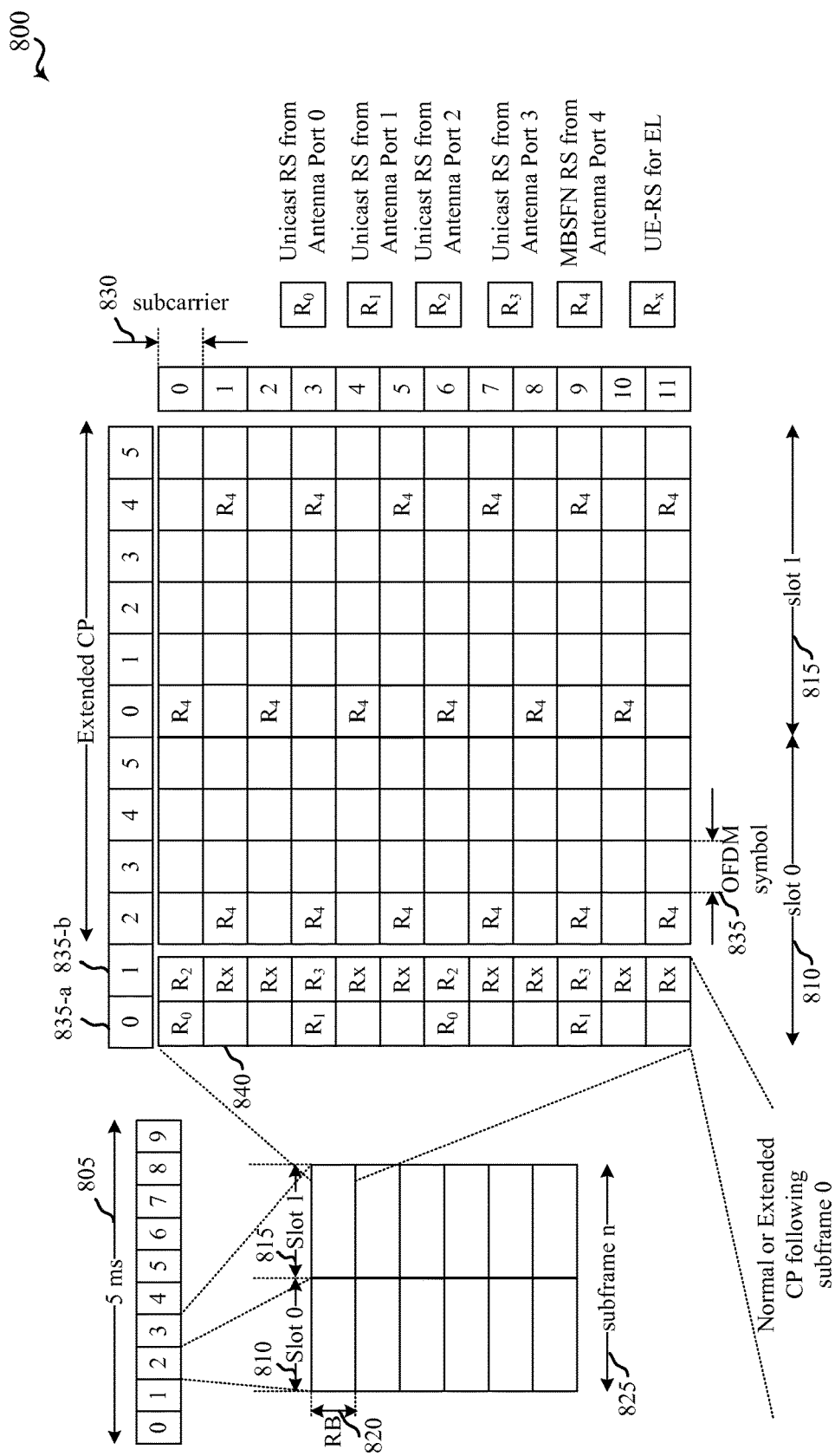
FIG. 8 is another illustration of reference signal locations for enhancement layer unicast and base layer MBSFN reference signals in accordance with various aspects of the present disclosure.

In further examples, UE-RS may be transmitted outside of the MBSFN data REs. One such example is illustrated in FIG. 8, which provides an illustration of transmission resources 800 including indications of particular resources used for various reference signals. In this example, a first half of a radio frame 805 is illustrated having a number of numbered slots of a radio frame. Each subframe 825 of the radio frame 805 includes two slots, including slot 0 810 and slot 1 815. Each slot is 0.5 ms, and includes a number of resource blocks (RBs) 820. Within a resource block 820, a number of resource elements (REs) 840 are defined by a subcarrier 830 and OFDM symbol 835. In transmissions using an extended cyclic prefix (CP), there are six OFDM symbols in each slot, as illustrated in FIG. 8. UE-RS may occupy some of the resource elements 840 in the first two OFDM symbols, and may include four UE-RSs $R_0$, $R_1$, $R_2$, and $R_3$, which correspond to unicast RS for antenna ports 0-3, respectively. Further, an MBSFN-RS, $R_4$, is provided in resource elements within the MBSFN data REs of the remainder of the first slot 810 and second slot 815. In this example, UE-RSs $R_x$ for the enhancement layer may not be transmitted in the MBSFN data REs, but may instead be transmitted in the second OFDM symbol 835 of slot 0 810.

In the example of FIG. 8, the first two OFDM symbols 835-*a*, 835-*b* are not in the MBSFN region, and a PCFICH may be transmitted in the first OFDM symbol 835-*a*. However, the PCFICH may only occupy one OFDM symbol for the PDCCH, and a legacy UE may not attempt to read the second OFDM symbol 835-*b* with the exception of reading the CRS REs associated with $R_2$ and $R_3$ if there are 4 antenna ports. In this example, the remaining REs of the second OFDM symbol 835-*b* may be used to add a UE-RS $R_x$ for the enhancement layer in the RBs that are assigned to the UE for unicast downlink transmissions. The UE-RS Rx may be included in the second OFDM symbol 835-*b* in REs that may not include CRS for antenna ports 3 and 4 ($R_2$, $R_3$), if these CRS are needed. While all available REs of the second OFDM symbol are illustrated as including reference signal $R_x$ in FIG. 8, this signal may be down sampled if that particular number of RSs are not needed for a particular subframe. In examples, the first OFDM symbol 835-*a* may include a PDCCH, and UE capable of hierarchical modulation may decode the first OFDM symbol 835-*a*, determine any downlink assignments transmitted therein, and identify the RBs assigned for the UE-RS $R_x$.

A UE receiving the transmission may then estimate the enhancement modulation channel using the UE-RS $R_x$ in the identified RBs of the second OFDM symbol 835-*b*. In such examples, no UE-RS may be transmitted in the MBSFN region, thus enhancing the transmission of MBSFN data. In certain examples, if a UE is experiencing high mobility, the channel estimation provided by reference signal $R_x$ may degrade for later OFDM symbols in the subframe. In some examples, data blocks decoded in earlier OFDM symbols may be used to aid channel estimation for later OFDM symbols, thus providing for improved channel estimation for the later OFDM symbols. Similarly as discussed above, unicast transmissions on the enhancement layer may be rate-matched around the MBSFN-RS $R_4$, and thus a clean channel estimation of the MBSFN channel on the base modulation layer. Furthermore, channel estimations for both the base modulation layer and enhancement modulation layer may be available before demodulating the base layer and enhancement layer transmissions, which may allow for joint demodulation of each hierarchical modulation layer and thus potentially better UE performance.

In other examples, the UE-RS $R_x$ illustrated in FIG. 8 may share the second OFDM symbol 835-*b* with control channel information from, for example, the PCFICH. In examples where the first OFDM symbol 835-*a* of the first slot 810 cannot transmit all of the required control information, some resource element groups (REGs) in the second OFDM symbol 835 may be used to transmit such control channel information. In such examples, the UE-RS $R_x$ for the enhancement layer may be inserted into unused REGs of the second OFDM symbol 835-*b*. A legacy UE without capability for hierarchical modulation communications will not decode anything from these REGs, and a UE capable of hierarchical modulation communications may monitor these REGs for downlink assignments and UE-RS $R_x$ for the enhancement layer. In such examples, the RBs available for unicast may be limited by the number of REGs available in the second OFDM symbol 835-*b*. In some examples, the PDCCH REGs may be moved around within the first two OFDM symbols 835-*a* and 835-*b* of the first slot 810 in order to provide additional REGs in the second OFDM symbol 835-*b* for transmission of UE-RS $R_x$.

Figure 9:
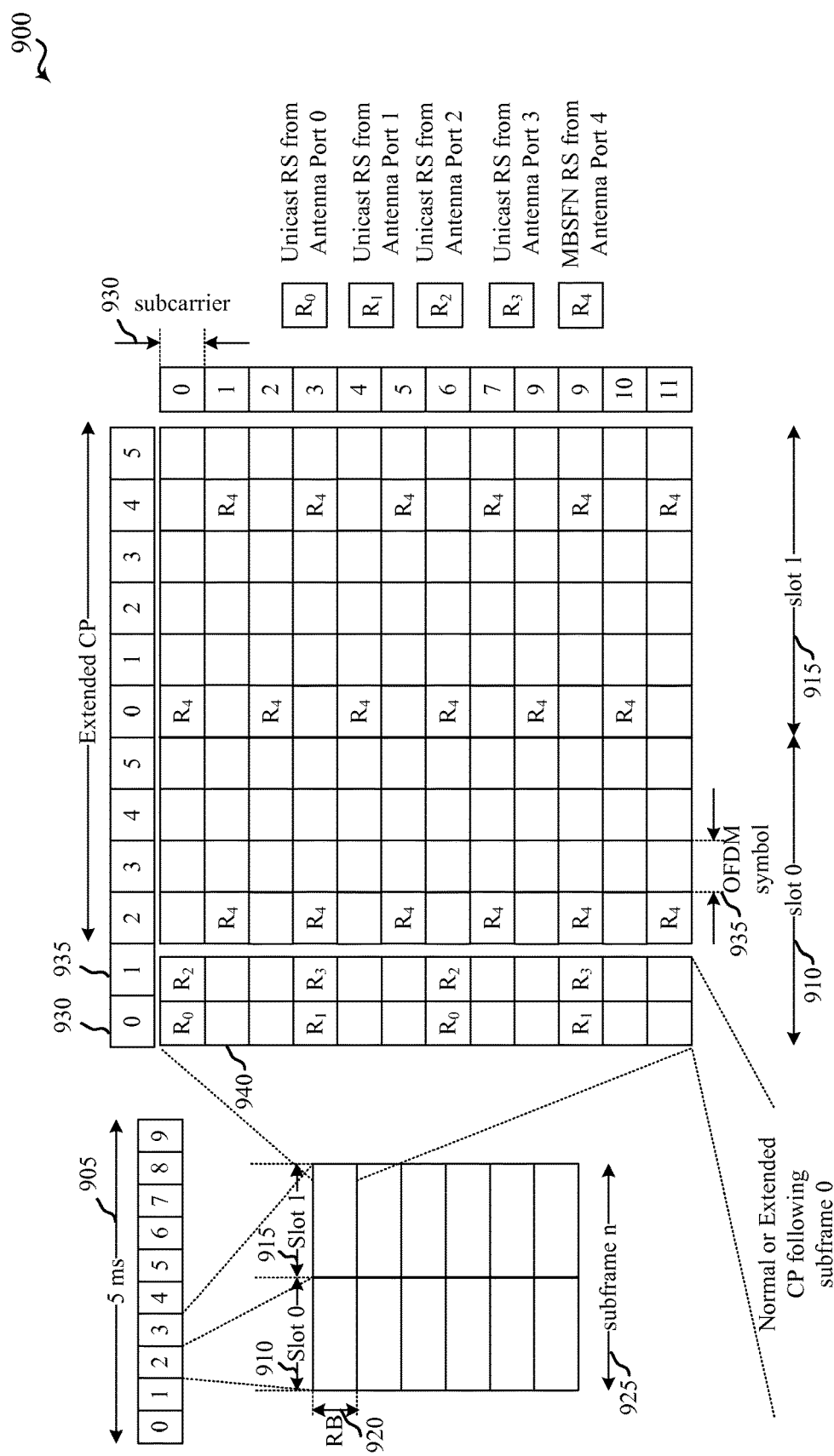
FIG. 9 is another illustration of common reference signal locations for enhancement layer unicast and base layer MBSFN reference signals in accordance with various aspects of the present disclosure.

In still further examples, channel estimation for the unicast transmissions on the enhancement modulation layer may be based on CRS transmissions. One such example is illustrated in FIG. 9, which provides an illustration of transmission resources 900 including indications of particular resources used for various reference signals. In this example, a first half of a radio frame 905 is illustrated having a number of numbered slots of a radio frame. Each subframe 925 of the radio frame 905 includes two slots, including slot 0 910 and slot 1 915. Each slot may be 0.5 ms, and may include a number of resource blocks 920. Within a resource block 920, a number of resource elements 940 are defined by a subcarrier 930 and OFDM symbol 935. In transmissions using an extended cyclic prefix, there are six OFDM symbols in each slot, as illustrated in FIG. 9. UE-RS occupy some of the resource elements 940 in the first two OFDM symbols 935-a and 935-b, and may include four UE-RSs $R_0$, $R_1$, $R_2$, and $R_3$, which correspond to unicast RS for antenna ports 0-4, respectively. Further, an MBSFN-RS, $R_4$, is provided in resource elements within the MBSFN data REs of the remainder of the first slot 910 and second slot 915. In this example, enhancement layer channel estimation may be performed using a CRS transmitted in OFDM symbols 935-a and 935-b. In such examples, the PDCCH region of OFDM symbols 935-a and 935-b may not be modified, and no UE-RSs are added in MBSFN region. Similarly as discussed with the UE-RS $R_x$ for enhancement layer of FIG. 8, a UE receiving the transmission may estimate the enhancement modulation channel using the CRS on the first two OFDM symbols 935-a, 935-b. Also similarly is discussed with respect to FIG. 8, if a UE is experiencing high mobility, the channel estimation provided by the CRS may degrade for later OFDM symbols in the subframe. In some examples, data blocks decoded in earlier OFDM symbols may be used to aid channel estimation for later OFDM symbols, thus providing for improved channel estimation for the later OFDM symbols. Also, channel estimations for both the base modulation layer and enhancement modulation layer may be available before the demodulating the base layer and enhancement layer transmissions, which may allow for joint demodulation of each hierarchical modulation layer and thus potentially better UE performance. Thus, for a UE receiving transmissions, if a subframe is designated for MBSFN, the UE may perform channel estimation based on the CRS in the first two OFDM symbols 935-a, 935-b in the current subframe, as well as the CRS in the first two OFDM symbols in the even earlier SFs, if available, with filtering. Additionally, a UE may use the CRS from the first two OFDM symbols in a subsequent subframe. Thus, the channel estimation quality for the unicast demodulation may be better at the beginning and the end of the MBSFN region. In some examples, the decoding order of the code blocks may be changed to start with the blocks at two ends first, then use decoded data to perform data aided channel estimation, and then decode inner code blocks. In other examples, different code rates may be used for different code blocks as channel estimation quality improves towards the center code blocks, with a lower rate in code blocks at the two ends and higher code rate in the center. Such changes in code rates may be signaled to the UE to assist with receipt and decoding of the unicast enhancement layer transmissions.

Figure 10:
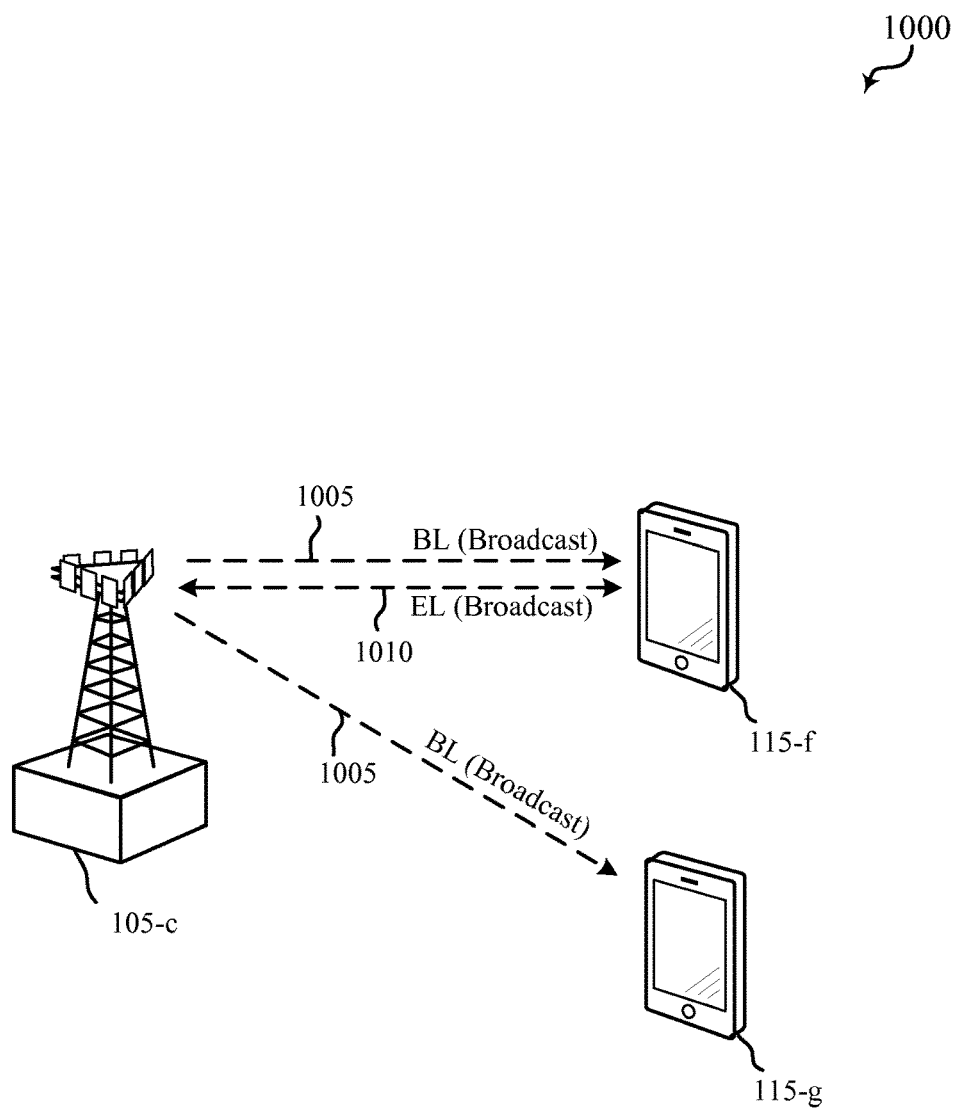
FIG. 10 illustrates another hierarchical modulation environment in accordance with various aspects of the present disclosure.

With reference now to FIG. 10 a system 1000 is illustrated in which an eNB 105-c may be in communication with UE 115-f and UE 115-g using hierarchical modulation. System 1000 may illustrate, for example, aspects of wireless communications systems 100, 200, and/or 300 illustrated in FIGS. 1, 2 and/or 3. In this example, similarly as above, multiple modulation layers may be employed for wireless communications, in which a base modulation layer 1005 and an enhancement modulation layer 1010 may be concurrently transmitted between the eNB 105-c and the UEs 115-f and 115-g. In this example, base modulation layer 1005 may include broadcast data that is transmitted to multiple different UEs, such as UE 115-f and UE 115-g.

The enhancement modulation layer 1010, in this example, may be superpositioned on the base modulation layer 1005 and include broadcast data for UE 115-f. The enhancement modulation layer and base modulation layer may be transmitted in a single communications link between eNB 105-c to UE 115-f, in a manner such as described above. In this example, UE 115-f may have sufficient channel quality to receive and decode the enhancement modulation layer 1010, while UE 115-g may either not have sufficient channel quality to receive and decode the enhancement modulation layer 1010 or may not be capable of receiving the enhancement modulation layer 1010. The broadcast transmission on the enhancement modulation layer 1010 may provide, for example, higher resolution for a signal transmitted on the base modulation layer, or may provide one or more additional broadcast channels. In some examples, the enhancement modulation layer 1010 may be used to provide venue-cast transmissions to UEs 115 located at a particular venue. For example, UEs located in a shopping mall may receive MBSFN transmissions on enhancement modulation layer 1010 that may include advertising or other information related to retail outlets located in the shopping mall. In other examples, UEs 115 located in a sports stadium may receive MBSFN transmissions on enhancement modulation layer 1010 that may include video replays, commentary, and/or advertising related to the sporting event.

Figure 11:
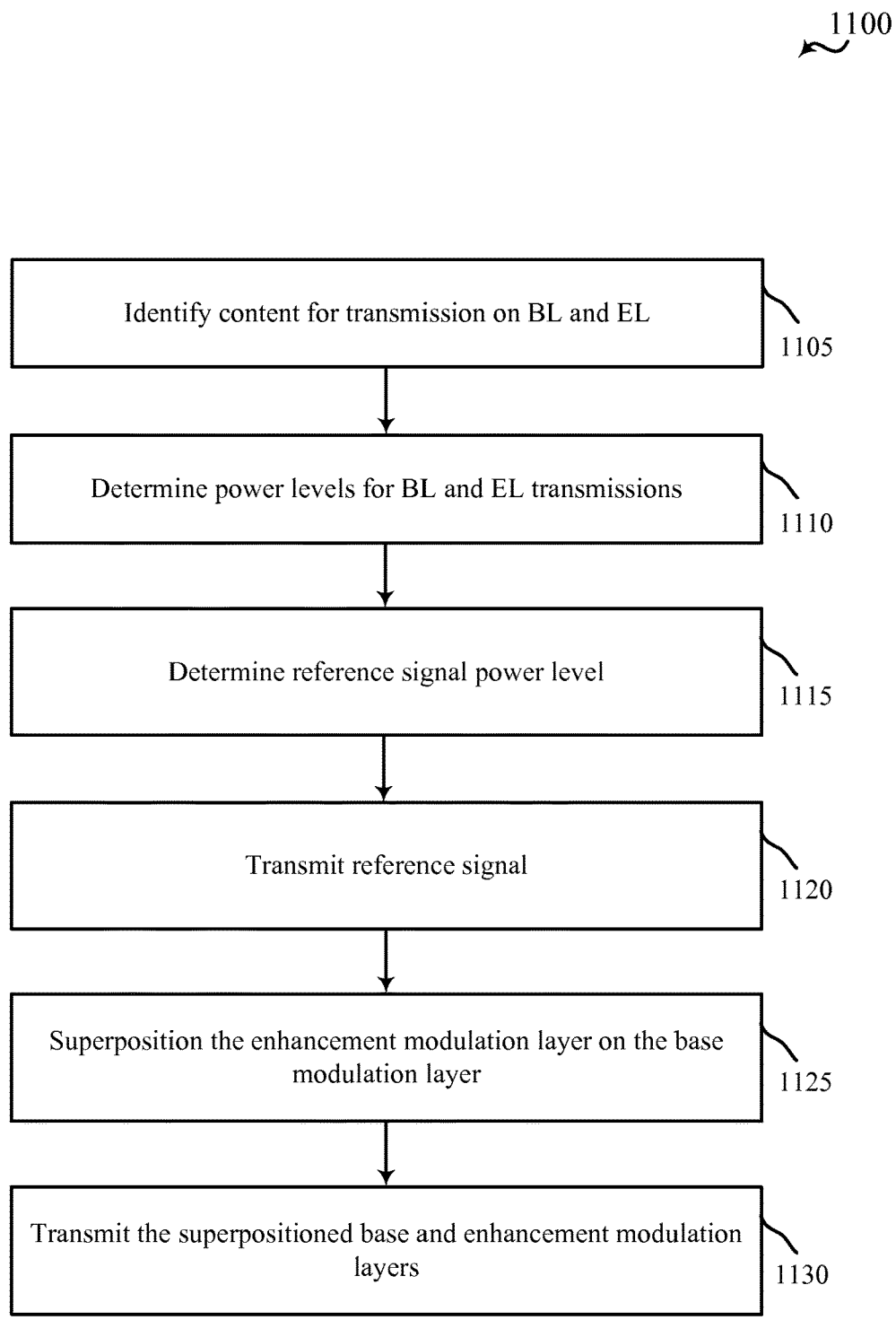
FIG. 11 is a flowchart of a method for hierarchical modulation of content in a base station according to various aspects of the present disclosure.

With reference now to FIG. 11, a flowchart conceptually illustrating an example of a method of wireless communication is described in accordance with aspects of the present disclosure. For clarity, the method 1100 is described below with reference to ones of the base stations 105 described with reference to FIGS. 1, 2, 3, and/or 10. In one example, a base station may execute one or more sets of codes to control the functional elements of the base station to perform the functions described below.

At block 1105, the base station may identify content for transmission on the base layer and on the enhancement layer. As mentioned above, the base layer may include broadcast transmissions having a first resolution or having a first set of channels, and the enhancement modulation layer may provide enhanced resolution to the first resolution or may provide a second set of channels in addition to the first set of channels, for example. At block 1110, the base station may determine the power levels for the base layer and enhancement layer transmissions. Transmission power levels may, in some examples, be adjusted based on desired base layer coverage and enhancement layer data rate. At block 1115, the base station may determine a reference signal power level for a MBSFN RS. The reference signal power level may be determined, in some examples, based on the power level of the base modulation layer, rather than on an aggregate power level of both the base modulation layer and enhancement modulation layer. At block 1120, the base station may transmit the reference signal according to the determined reference signal power level. At block 1125, the base station may modulate content onto base and enhancement modulation layers and superposition the enhancement modulation layer on the base modulation layer. At block 1130, the base station may transmit the superpositioned base modulation layer and enhancement modulation layer to the one or more UEs.

Figure 12:
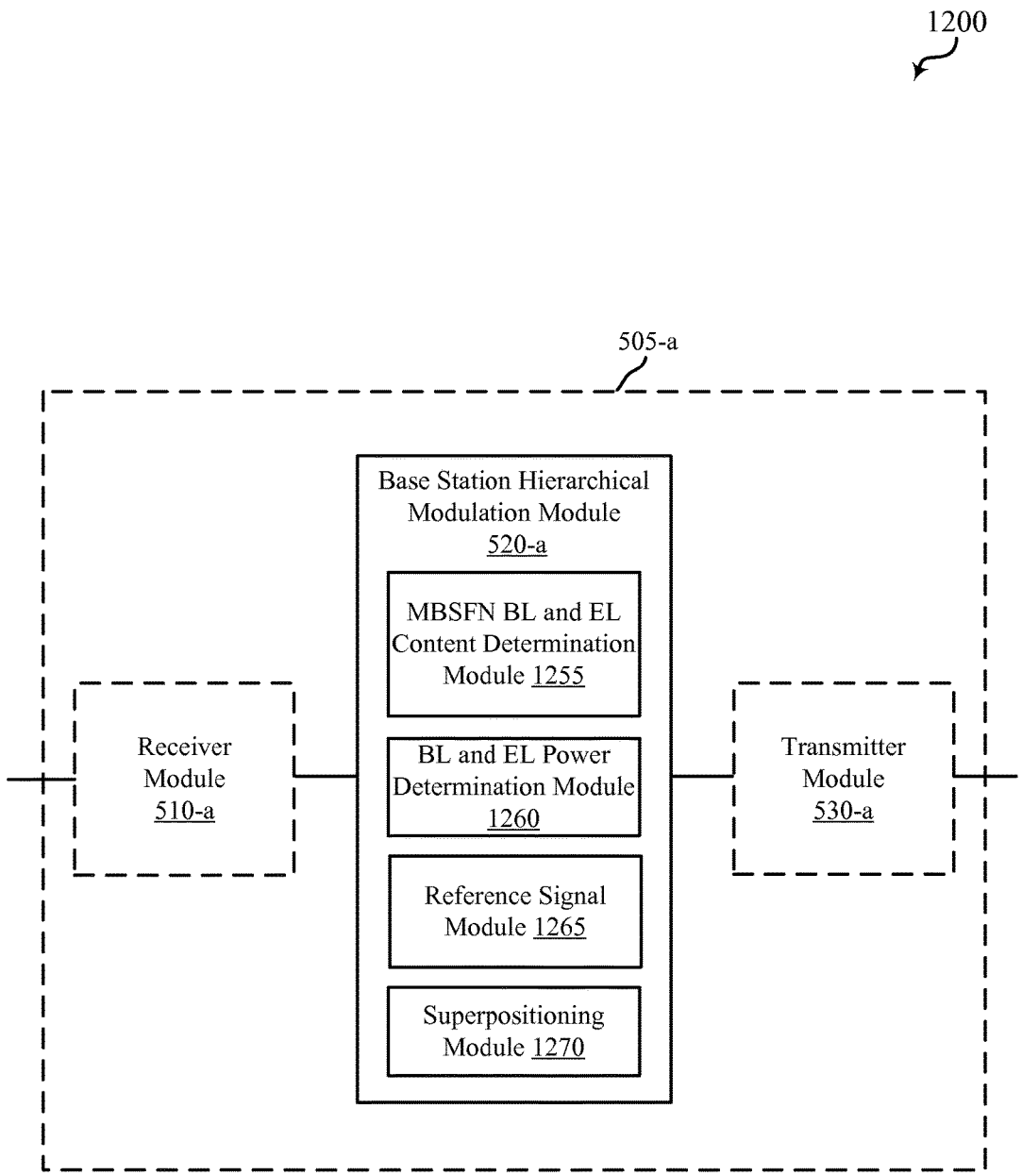
FIG. 12 shows a block diagram of a device that may be used for hierarchical modulation in accordance with various aspects of the present disclosure.

FIG. 12 is a block diagram 1200 conceptually illustrating a device 505-a, such as a base station, for use in wireless communications in accordance with aspects of the present disclosure. In some examples, the device 505-a may be an example of one or more aspects of the base stations 105 described with reference to FIGS. 1, 2, 3, and/or 10, and/or may be an example of device 505 of FIG. 5. The device 505-*a* may also be a processor. The device 505-*a* may include a receiver module 510-*a*, a base station hierarchical modulation module 520-*a*, and/or a transmitter module 530-*a*. Each of these components may be in communication with each other.

The components of the device 505-*a* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 510-*a* may be or include an RF receiver, such as an RF receiver operable to receive transmissions on two or more hierarchical modulation layers. The receiver module 510-*a* may be used to receive various types of data and/or control signals (i.e., transmissions) over one or more communication links of a wireless communications system, such as one or more communication links 125 of the wireless communications systems 100, 200, 300, and/or 1000 described with reference to FIGS. 1, 2, 3, and/or 10.

In some examples, the transmitter module 530-*a* may be or include an RF transmitter, such as an RF transmitter operable to transmit on two or more hierarchical modulation layers (e.g., through a base modulation layer and one or more enhancement modulation layers). The transmitter module 530-*a* may be used to transmit various types of data and/or control signals (i.e., transmissions) over one or more communication links of a wireless communications system, such as one or more communication links 125 of the wireless communications systems 100, 200, 300, and/or 1000 described with reference to FIGS. 1, 2, 3, and/or 10.

In some examples, the base station hierarchical modulation module 520-*a* may configure multiple hierarchical modulation layers and determine content to be transmitted on each hierarchical modulation layer for device 505-*a* when operating in a wireless communications system supporting transmissions on two or more hierarchical modulation layers. The base station hierarchical modulation module 520-*a* may, for example, configure device 505-*a* to determine content for transmission on each hierarchical modulation layer, modulation of the content on each hierarchical modulation layer, and superpositioning of the hierarchical modulation layers for transmission through transmitter module 530-*a*, such as described herein.

In some examples, base station hierarchical modulation module 520-*a* may include MBSFN base layer and enhancement layer content determination module 1255, a base layer and enhancement layer power determination module 1260, reference signal module 1265, and superpositioning module 1270. The MBSFN base layer and enhancement layer content determination module 1255 may determine content that is to be transmitted from the device 505-*a* using the base modulation layer and content that is to be transmitted from the device 505-*a* using the enhancement modulation layer, such as described above. The base layer and enhancement layer power determination module 1260 may determine power ratios at which the base layer and enhancement layer may be transmitted. As discussed above, base layer coverage may be traded for enhancement layer data rate, and in some examples the base layer and enhancement layer power determination module 1260 may dynamically or semi-statically set transmission powers based on desired coverage and/or desired data rates. In some examples, signaling of the relative power levels may be transmitted to UEs for channel estimation purposes.

The reference signal module 1265 may determine one or more of various reference signals to be transmitted for the base and enhancement modulation layers for use by a UE in receiving and decoding the base and enhancement layer transmissions. In some examples, the base and enhancement modulation layers may use a shared antenna port, and thus use a same MBSFN RS for channel estimation. The reference signal power, in some examples, may be set to correspond to the power at which the base modulation layer is transmitted, in order to provide legacy UEs with a consistent reference signal for use in channel estimation for the base modulation layer. In other examples, the base modulation layer may use a different antenna port than the enhancement modulation layer, and a different MBSFN RS may be transmitted for the base and enhancement layers. UEs capable of hierarchical modulation may, in some examples, receive signaling indicating a ratio of power levels of the base modulation layer and enhancement modulation layer, and use this information to jointly de-map the different modulation layers or adjust for the interference level during channel estimation. The superpositioning module 1270 may superposition the modulated enhancement modulation layer onto the base modulation layer for transmission by the transmitter module 530-*a*.

Figure 13:
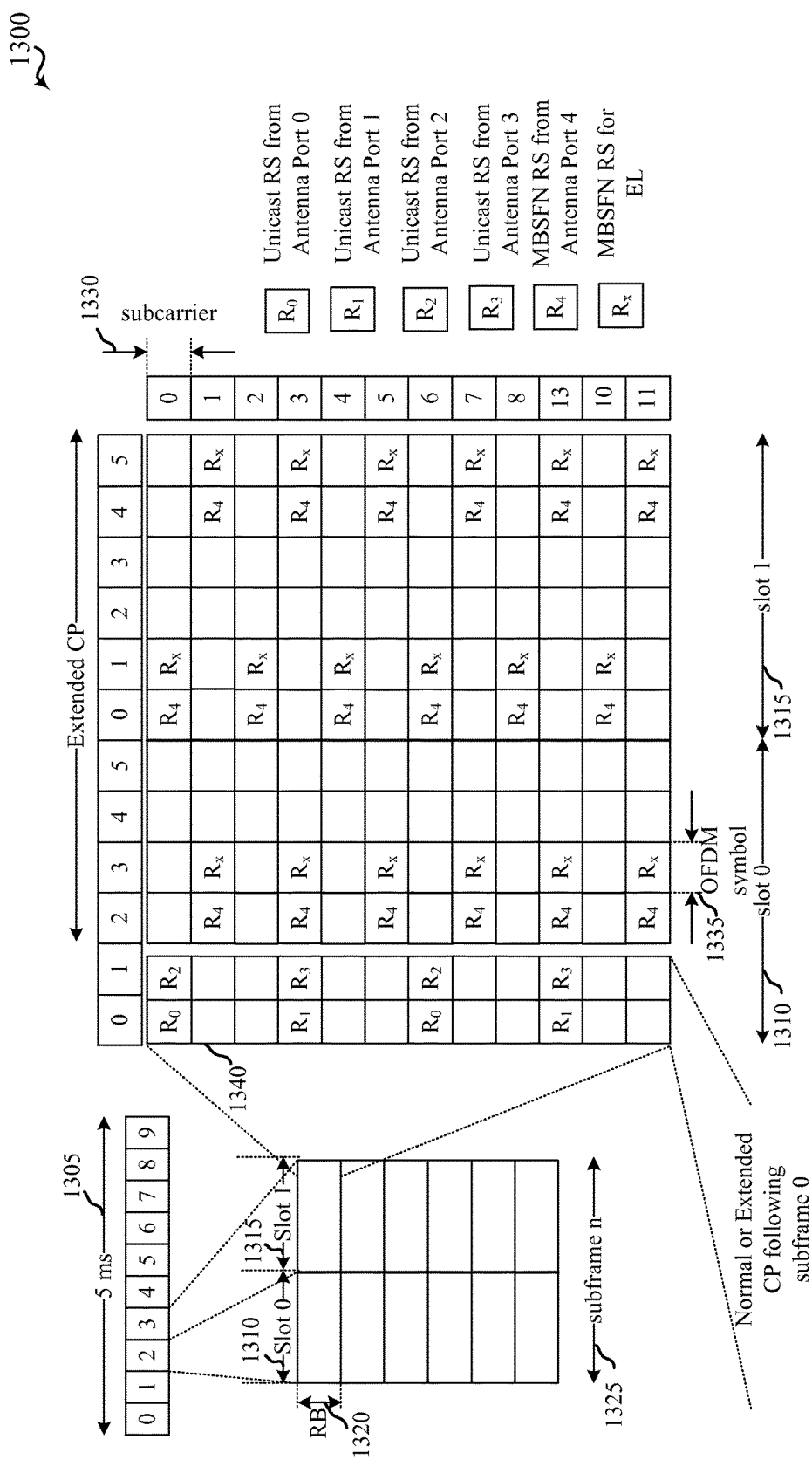
FIG. 13 is an illustration of reference signal locations for enhancement layer MBSFN and base layer MBSFN reference signals in accordance with various aspects of the present disclosure.

As mentioned above, in some examples different antenna ports may be used for the base modulation layer and enhancement modulation layer transmissions, and separate MBSFN RS transmissions may be provided for each antenna port. One example of such different MBSFN transmissions is illustrated in FIG. 13, which provides an illustration of transmission resources 1300 including indications of particular resources used for various reference signals. In this example, a first half of a radio frame 1305 is illustrated having a number of numbered slots of a radio frame. Each subframe 1325 of the radio frame 1305 may include two slots, including slot 0 1310 and slot 1 1315. Each slot may be 0.5 ms, and include a number of resource blocks 1320. Within a resource block 1320, a number of resource elements 1340 are defined by a subcarrier 1330 and OFDM symbol 1335. In transmissions using an extended cyclic prefix, there may be six OFDM symbols in each slot, as illustrated in FIG. 13. UE-RS may occupy some of the resource elements 1340 in the first two OFDM symbols, and may include four UE-RSs $R_0$, $R_1$, $R_2$, and $R_3$, which correspond to unicast RS for antenna ports 0-3, respectively.

Further, an MBSFN RS, $R_4$, for the base modulation layer is provided in resource elements within the MBSFN data REs of the remainder of the first slot 1310 and second slot 1315. In some examples, an MBSFN RS $R_x$ for the enhancement layer may be provided that punctures a portion of the MBSFN REs. Such a reference signal $R_x$ may provide for improved channel estimation for the enhancement layer, but may result in a slight performance degradation for the base layer transmissions for legacy UEs that attempt to receive and decode these REs as part of the MBSFN transmissions. In other examples, the enhancement layer reference signal $R_x$ may be overlaid with MBSFN data REs rather than puncturing the REs. and the MBSFN RS $R_4$, and may be decoded after interference cancellation with the data REs transmitted in the base modulation layer.

In some examples, because the coverage area for the enhancement layer MBSFN transmissions may be reduced compared to the coverage area for the base layer MBSFN transmissions, the density of the reference signal $R_x$ may be reduced, and in some examples is reduced to about one-third the density of the base layer reference signal $R_4$, although other densities may also be used. In some examples, different precoding may be used on the different modulation layers to provide additional spatial separation and reduce cross-layer interference. Additionally, in certain examples, the enhancement layer reference signal $R_x$ as well as enhancement layer MBSFN transmissions may be rate matched around the locations of base layer reference signal $R_4$ so as to not provide enhancement layer transmissions during transmissions of reference signal $R_4$ and provide improved channel estimation for the base layer MBSFN channel. In some examples, a traffic-to-pilot (T2P) ratio between the base layer power level and the reference signal power level is zero dB Referring now to FIG. 14, a block diagram 1400 illustrates a device 1405 for use in wireless communications, in accordance with various aspects of the present disclosure. In some examples, the device 1405 may be an example of one or more aspects of the UEs 115 described with reference to FIGS. 1, 2, 3, and/or 10. The device 1405 may also be a processor. The device 1405 may include a receiver module 1410, a UE interference mitigation module 1420, a UE hierarchical modulation module 1425, and/or a transmitter module 1430. Each of these components may be in communication with each other.

The components of the device 1405 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may be or include an RF receiver, such as an RF receiver operable to receive transmissions on two or more hierarchical modulation layers. In some examples, the transmitter module 1430 may be or include an RF transmitter, such as an RF transmitter operable to transmit data on two or more hierarchical modulation layers. The transmitter module 1430, in some examples, may include a single transmitter or a single transmitter per transmit/receive chain. The transmitter module 1430 may be used to transmit various types of data and/or control signals (i.e., transmissions) over one or more communication links of a wireless communications system including two or more hierarchical modulation layers, such as one or more communication links 125 of the wireless communications systems 100, 200, 300, and/or 1000 described with reference to FIGS. 1, 2, 3, and/or 10.

In some examples, the UE interference mitigation module 1420 may perform interference mitigation on signals received at the receiver module 1410. For example, UE interference mitigation module 1420 may perform interference cancellation techniques on received signals to, for example, cancel interference associated with the base modulation layer from the received signal to provide the enhancement layer that may be decoded. The UE hierarchical modulation module 1425 may decode multiple hierarchical modulation layers and determine content transmitted on one or more hierarchical modulation layers for device 1405 when operating in a wireless communications system supporting transmissions on two or more hierarchical modulation layers.

The UE hierarchical modulation module 1425 may, for example, configure device 1405 to decode a base modulation layer, perform interference cancellation techniques on the received signal to cancel interference from the base modulation layer, and decode the enhancement modulation layer. The UE hierarchical modulation module 1425 may also determine parameters associated with the one or more modulation layers to assist in interference cancellation and decoding of the modulation layers. Such parameters may include, for example, a ratio of base layer power to modulation layer power, information on resources to transmit one or more reference signals, and/or timing for transmissions of the enhancement modulation layer. In some examples, two or more enhancement modulation layers may be present, in which case the UE hierarchical modulation module 1425 may manage the performance of successive interference cancellation and decoding of each successive modulation layer.

Figure 15:
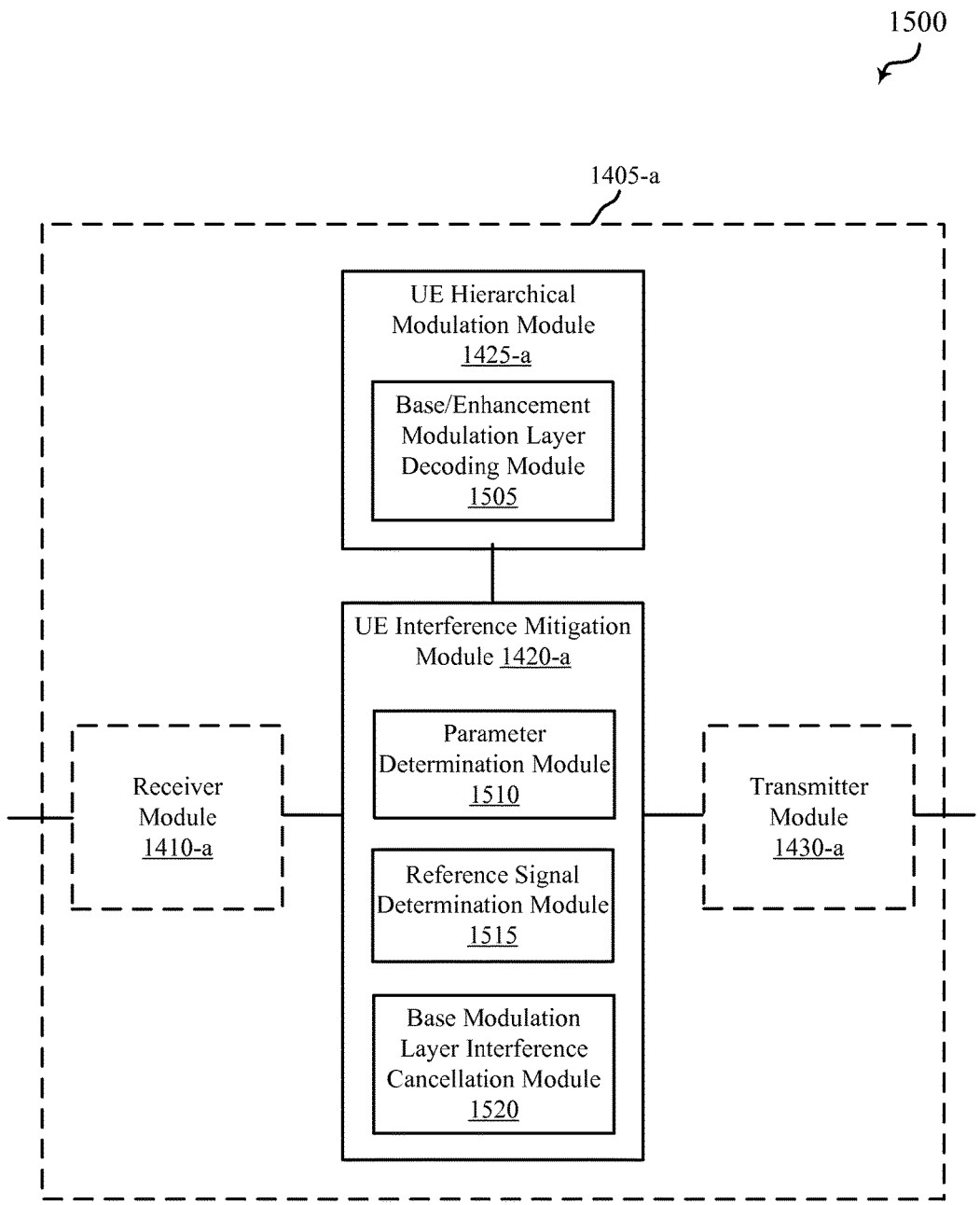
FIG. 15 shows a block diagram of another device that may be used for hierarchical modulation at a user equipment in accordance with various aspects of the present disclosure.

Referring now to FIG. 15, a block diagram 1500 illustrates a device 1405-a for use in wireless communications, in accordance with various aspects of the present disclosure. In some examples, the device 1405-a may be an example of one or more aspects of the UEs 115 or device 1405 described with reference to FIGS. 1, 2, 3, 10, and/or 14. The device 1405-a may also be a processor. The device 1405-a may include a receiver module 1410-a, a UE interference mitigation module 1420-a, a UE hierarchical modulation module 1425-a, and/or a transmitter module 1430-a. Each of these components may be in communication with each other.

The components of the device 1405-a may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 14:
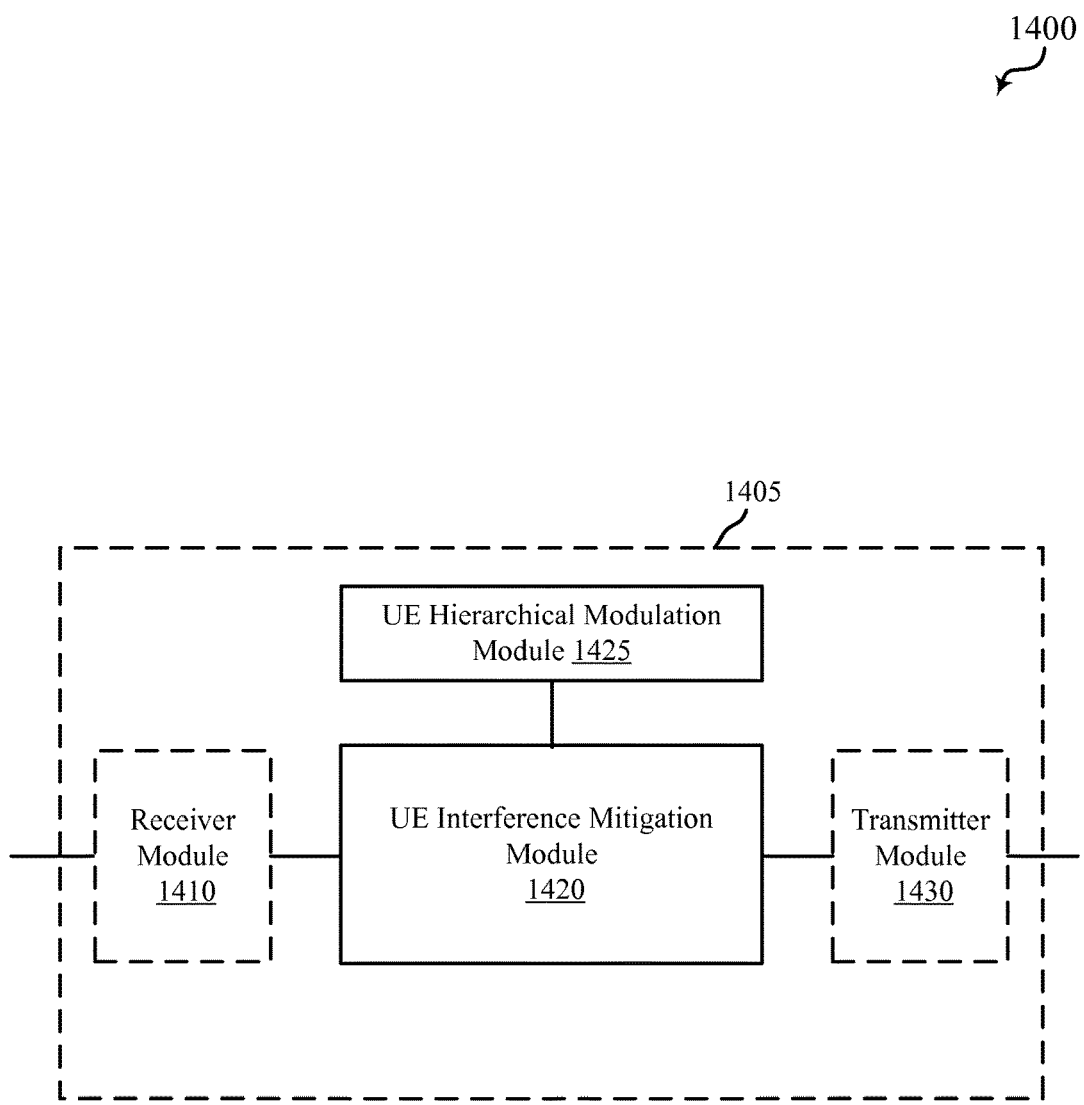
FIG. 14 shows a block diagram of a device that may be used for hierarchical modulation at a user equipment in accordance with various aspects of the present disclosure.

In some examples, the receiver module 1410-a may be an example of the receiver module 1410 of FIG. 14. The receiver module 1410-a may be or include an RF receiver, such as an RF receiver operable to receive transmissions on two or more hierarchical modulation layers. In some examples, the transmitter module 1430-a may be an example of the transmitter module 1430 of FIG. 14. The transmitter module 1430-a may be or include an RF transmitter, such as an RF transmitter operable to transmit data on two or more hierarchical modulation layers. The transmitter module 1430-a, in some examples, may include a single transmitter or a single transmitter per transmit/receive chain. The transmitter module 1430-a may be used to transmit various types of data and/or control signals (i.e., transmissions) over one or more communication links of a wireless communications system, such as one or more communication links 125 of the wireless communications systems 100, 200, 300, and/or 1000 described with reference to FIGS. 1, 2, 3, and/or 10.

The UE interference mitigation module 1420-*a* may be an example of the UE interference mitigation module 1420 described with reference to FIG. 14 and may include a parameter determination module 1510, a reference signal determination module 1515, and a base modulation layer interference cancellation module 1520. Each of these components may be in communication with each other. The parameter determination module 1510 may determine one or more parameters associated with the base and/or enhancement modulation layers for use in interference cancellation. For example, the parameter determination module 1510 may determine one or more of an energy ratio between the base and enhancement modulation layers, an MCS of each of the layers, resource block locations of data transmitted to the UE on one or more of the base or enhancement modulation layers, a precoding matrix used for transmitting on one or more of the base or enhancement modulation layers, layer mapping for one or more of the base or enhancement modulation layers, code block size for one or more of the base or enhancement modulation layers, and/or a number of spatial layers for one or more of the base or enhancement modulation layers. The reference signal determination module 1515 may determine one or more reference signals transmitted for one or more of the base and enhancement modulation layers, based on resources identified for the reference signals, for example. The base modulation layer interference cancellation module 1520 may use the parameters provided by parameter determination module 1510 and reference signal information provided by reference signal determination module 1515 to cancel interference associated with the base modulation layer and provide the resultant signal for decoding of the enhancement modulation layer. Interference cancellation techniques may include CWIC or SLIC as discussed above, for example.

The UE hierarchical modulation module 1425-*a* may be an example of the UE hierarchical modulation module 1425 described with reference to FIG. 14 and may include a base/enhancement modulation layer decoding module 1505. The base/enhancement modulation layer decoding module 1505 may operate to decode content modulated onto the base modulation layer and enhancement modulation layer.

Figure 16:
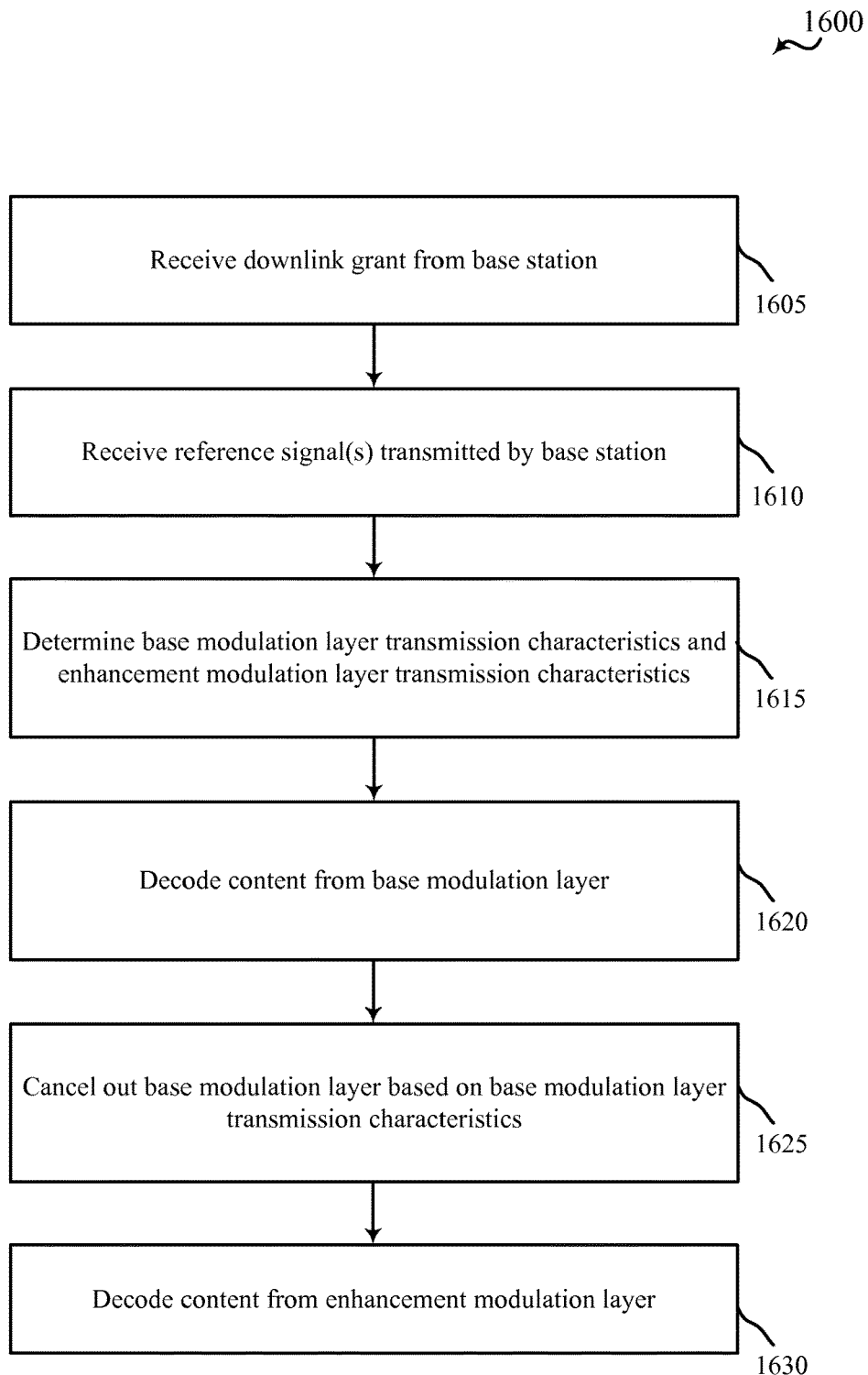
FIG. 16 is a flowchart of a method for hierarchical modulation of content in a user equipment according to various aspects of the present disclosure.

With reference now to FIG. 16, a flowchart conceptually illustrating an example of a method of wireless communication is described in accordance with aspects of the present disclosure. For clarity, the method 1600 is described below with reference to ones of the UEs 115 and/or devices 1405 described with reference to FIGS. 1, 2, 3, 10 14 and/or 15. In one example, a UE may execute one or more sets of codes to control the functional elements of the UE to perform the functions described below.

At block 1605, the UE may receive a downlink grant from a base station. For example, the UE may receive a downlink grant from a base station indicating that downlink resources have been allocated for a base modulation layer and/or an enhancement modulation layer. At block 1610, the UE may receive one or more reference signals transmitted by the base station. The reference signals may be received according to resources allocated for the reference signals, which may include separate resources for the base and enhancement modulation layers, such as described above. At block 1615, the UE may determine base modulation layer transmission characteristics and enhancement modulation layer transmission characteristics. Such characteristics may be determined based on signaling information included in the downlink grant, may be determined based on RRC signaling received that includes parameters associated with hierarchical modulation layers, and/or may be determined based on information from the received reference signal(s). At block 1620, the UE may decode content from base modulation layer.

At block 1625, the UE may perform interference cancellation techniques on the received signal to mitigate interference in the signal from the base modulation layer. The interference cancellation may be based on, for example, base modulation layer transmission characteristics and/or enhancement modulation layer characteristics provided in control signaling in the downlink grant or through RRC signaling. The control signaling may include signal characteristics of the base modulation layer for use in performing the interference mitigation, for example. In some examples, the control signaling may be provided in the base modulation layer. The interference cancellation also may be based on information from the reference signals(s), and channel estimations for transmissions on the base modulation layer and enhancement modulation layer. The interference cancellation techniques may include one or more established interference cancellation techniques, such as, for example, linear minimum mean squared error (MMSE) suppression, QR decomposition based sphere decoding (QR-SD), successive interference cancelation (SIC), SLIC, and/or CWIC. At block 1630, the UE decodes content from enhancement modulation layer. Such content may include content that is determined to be sent using the enhancement modulation layer, such as unicast data or additional MBSFN transmissions transmitted in addition to the base layer MBSFN transmissions.

Figure 17:
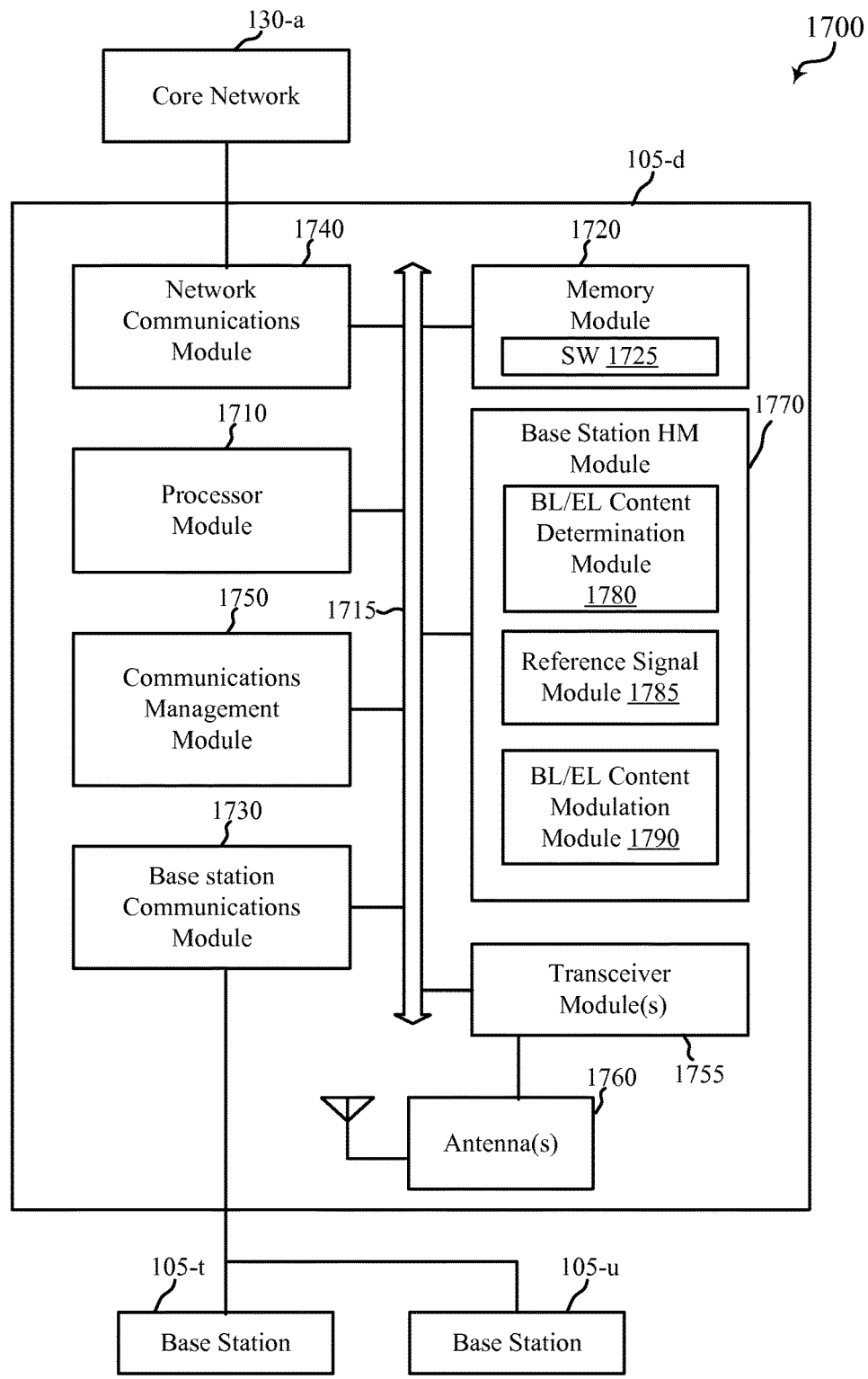
FIG. 17 is a block diagram that illustrates an example of a base station architecture according to various examples.

Turning to FIG. 17, a diagram 1700 is shown that illustrates a base station 105-*d* configured for hierarchical modulation in accordance with aspects of the present disclosure. In some embodiments, the base station 105-*d* may be an example of a base station 105 of FIGS. 1, 2, 3, and/or 10. The base station 105-*d* may be configured to implement at least some of the features and functions described above with respect to FIGS. 1-16. The base station 105-*d* may include a processor module 1710, a memory module 1720, a transceiver module 1755, antennas 1760, and a base station hierarchical modulation (HM) module 1770. The base station 105-*d* may also include one or both of a base station communications module 1730 and a network communications module 1740. Each of these components may be in communication with each other, directly or indirectly, over one or more buses 1715.

The memory module 1720 may include random access memory (RAM) and read-only memory (ROM). The memory module 1720 may also store computer-readable, computer-executable software (SW) code 1725 containing instructions that are configured to, when executed, cause the processor module 1710 to perform various functions described herein. Alternatively, the software code 1725 may not be directly executable by the processor module 1710 but be configured to cause the computer, e.g., when compiled and executed, to perform functions described herein.

The processor module 1710 may include an intelligent hardware device, e.g., a central processing unit (CPU), a microcontroller, an ASIC, etc. The processor module 1710 may process information received through the transceiver module 1755, the base station communications module 1730, and/or the network communications module 1740. The processor module 1710 may also process information to be sent to the transceiver module 1755 for transmission through the antennas 1760, to the base station communications module 1730, and/or to the network communications module 1740. The processor module 1710 may handle, alone or in connection with the base station HM module 1770, various aspects hierarchical modulation using multiple modulation layers, as described herein.

The transceiver module 1755 may include a modem configured to modulate packets and provide the modulated packets to the antennas 1760 for transmission, and to demodulate packets received from the antennas 1760. The transceiver module 1755 may be implemented as one or more transmitter modules and one or more separate receiver modules. The transceiver module 1755 may support communications on multiple hierarchical modulation layers. The transceiver module 1755 may be configured to communicate bi-directionally, via the antennas 1760, with one or more UEs 115 as illustrated in FIGS. 1, 2, 3, and/or 10, for example. The base station 105-$d$ may typically include multiple antennas 1760 (e.g., an antenna array). The base station 105-$d$ may communicate with a core network 130-$a$ through the network communications module 1740. The core network 130-$a$ may be an example of the core network 130 of FIG. 1. The base station 105-$d$ may communicate with other base stations, such as the base station 105-$t$ and the base station 105-$u$, using the base station communications module 1730.

According to the architecture of FIG. 17, the base station 105-$d$ may further include a communications management module 1750. The communications management module 1750 may manage communications with stations and/or other devices. The communications management module 1750 may be in communication with some or all of the other components of the base station 105-$d$ via the bus or buses 1715. Alternatively, functionality of the communications management module 1750 may be implemented as a component of the transceiver module 1755, as a computer program product, and/or as one or more controller elements of the processor module 1710.

The base station HM module 1770 may be configured to perform and/or control some or all of the functions or aspects described in FIGS. 1-16 related to hierarchical modulation and MBSFN transmission. For example, the base station HM module 1770 may be configured to support multiple hierarchical modulation layers that may be transmitted concurrently with one or more other base layer transmissions, such as MBSFN transmissions. The base station HM module 1770 may include a base layer/enhancement layer (BL/EL) content determination module 1780 configured to determine content to be transmitted on the base modulation layer and enhancement modulation layer as described herein. A reference signal module 1785 may generate reference signals and transmit the reference signals on one or more of the base modulation layer and enhancement modulation layer, as described herein. BL/EL content modulation module 1790 may modulate base layer content and enhancement layer content onto base and enhancement layer transmissions, superposition the base and enhancement layers, and provide the superpositioned layers for transmission by the transceiver module(s) 1755. The base station HM module 1770, or portions of it, may be a processor. Moreover, some or all of the functionality of the base station HM module 1770 may be performed by the processor module 1710 and/or in connection with the processor module 1710.

Figure 18:
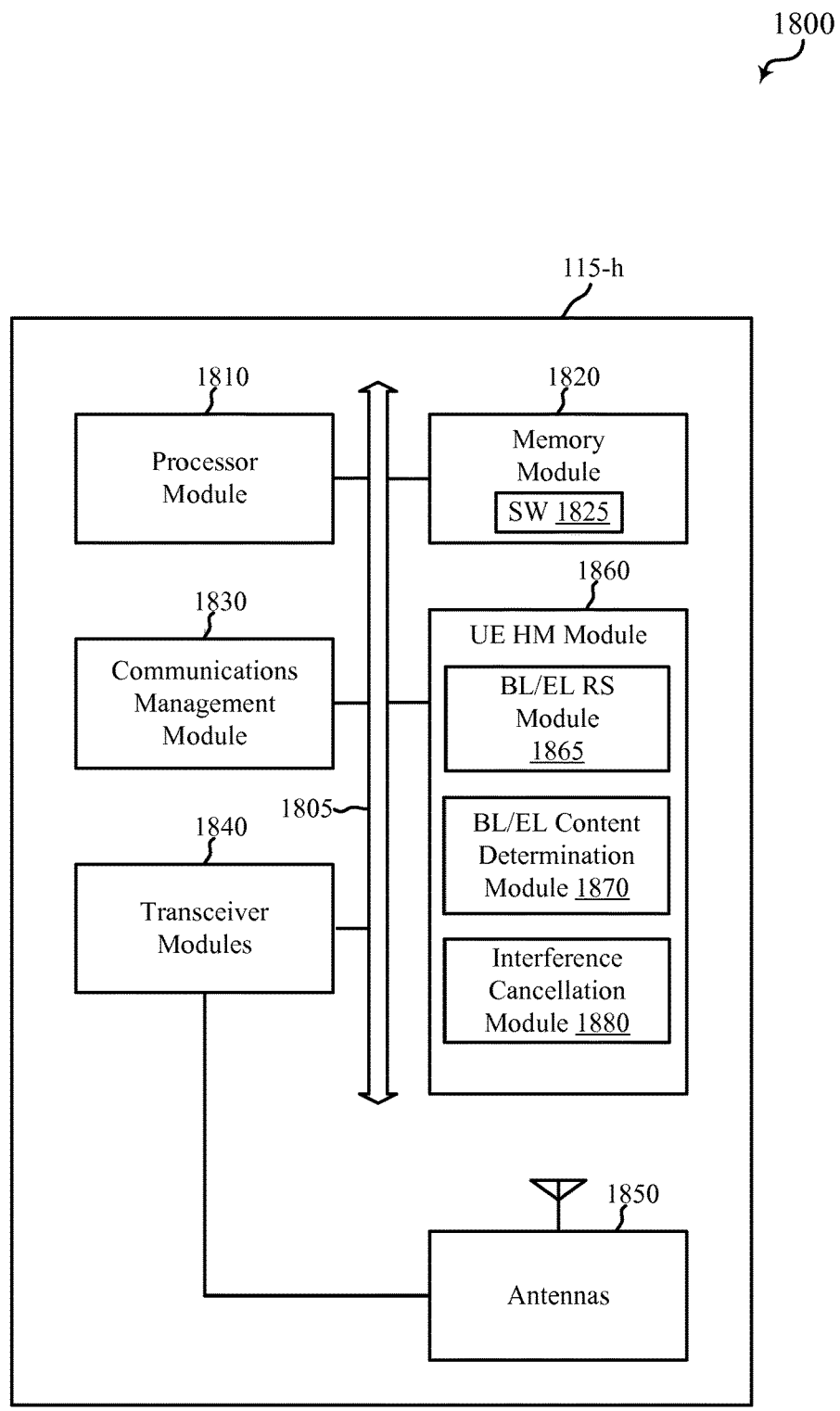
FIG. 18 shows a block diagram that illustrates an example of a user equipment (UE) architecture according to various examples.

Turning to FIG. 18, a diagram 1800 is shown that illustrates a UE 115-$h$ configured for hierarchical modulation and interference cancellation. The UE 115-$h$ may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 115-$h$ may have an internal power supply (not shown), such as a small battery, to facilitate mobile operation. The station UE 115-$h$ may be an example of the UEs 115 of FIGS. 1, 2, 3, and/or 10. The UE 115-$h$ may be configured to implement at least some of the features and functions described above with respect to FIGS. 1-16.

The UE 115-$h$ may include a processor module 1810, a memory module 1820, a transceiver module 1840, antennas 1850, and a UE HM module 1860. Each of these components may be in communication with each other, directly or indirectly, over one or more buses 1805.

The memory module 1820 may include RAM and ROM. The memory module 1820 may store computer-readable, computer-executable software (SW) code 1825 containing instructions that are configured to, when executed, cause the processor module 1810 to perform various functions described herein. Alternatively, the software code 1825 may not be directly executable by the processor module 1810 but be configured to cause the computer (e.g., when compiled and executed) to perform functions described herein.

The processor module 1810 may include an intelligent hardware device, e.g., a CPU, a microcontroller, an ASIC, etc. The processor module 1810 may process information received through the transceiver module 1840 and/or to be sent to the transceiver module 1840 for transmission through the antennas 1850. The processor module 1810 may handle, alone or in connection with the UE HM module 1860, various aspects of hierarchical modulation and interference cancellation.

The transceiver module 1840 may be configured to communicate bi-directionally with base stations (e.g., base stations 105). The transceiver module 1840 may be implemented as one or more transmitter modules and one or more separate receiver modules. The transceiver module 1840 may support communications on multiple hierarchical modulation layers. The transceiver module 1840 may include a modem configured to modulate packets and provide the modulated packets to the antennas 1850 for transmission, and to demodulate packets received from the antennas 1850. While the UE 115-$h$ may include a single antenna, there may be embodiments in which the UE 115-$h$ may include multiple antennas 1850.

According to the architecture of FIG. 18, the UE 115-$h$ may further include a communications management module 1830. The communications management module 1830 may manage communications with various access points. The communications management module 1830 may be a component of the UE 115-$h$ in communication with some or all of the other components of the UE 115-$h$ over the one or more buses 1805. Alternatively, functionality of the communications management module 1830 may be implemented as a component of the transceiver module 1840, as a computer program product, and/or as one or more controller elements of the processor module 1810.

The UE HM module 1860 may be configured to perform and/or control some or all of the UE functions or aspects described in FIGS. 1-16 related to hierarchical modulation layers transmission and reception, and various interference cancellation procedures. For example, the UE HM module 1860 may be configured to support multiple hierarchical modulation layers and interference cancellation related to the multiple modulation layers. The UE HM module 1860 may include a BL/EL RS module 1865 configured to receive one or more reference signals transmitted by a base station for use in channel estimation and decoding of transmissions from one or more base stations, as described herein. A BL/EL content determination module 1870 may determine the content that is transmitted on one or both of the enhancement modulation layer or base modulation layer, as discussed herein. BL/EL RS module 1865 also may determine various parameters related to interfering signals, which may be used by interference cancellation module 1880 to cancel interference from the interfering signals. The UE HM module 1860, or portions of it, may be a processor. Moreover, some or all of the functionality of the UE HM module 1860 may be performed by the processor module 1810 and/or in connection with the processor module 1810.

Figure 19:
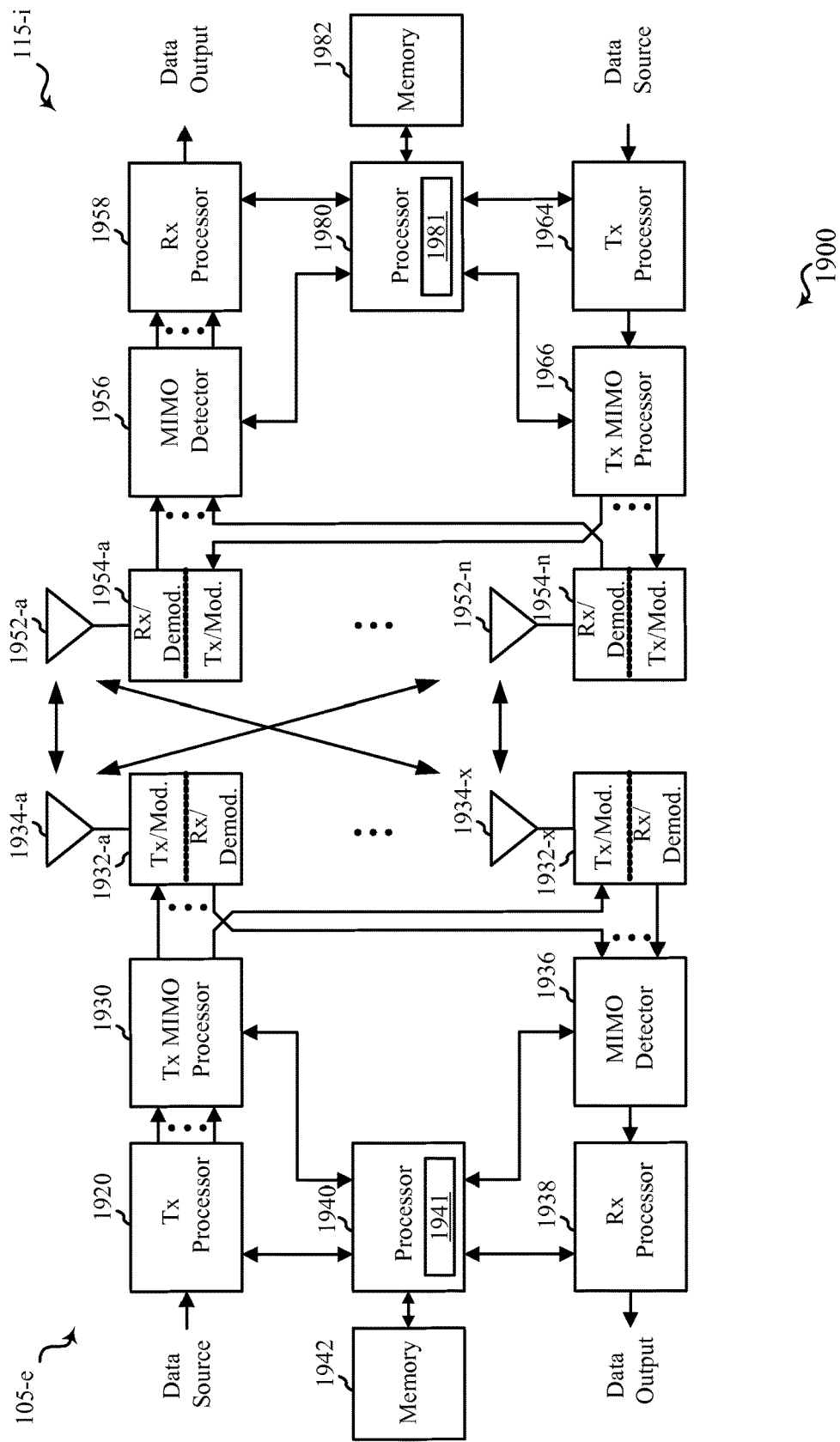
FIG. 19 shows a block diagram that illustrates an example of a multiple-input multiple-output (MIMO) communications system according to various examples.

Turning next to FIG. 19, a block diagram of a multiple-input multiple-output (MIMO) communication system 1900 is shown including a base station 105-*e* and a user equipment or UE 115-*i*. The base station 105-*e* and the UE 115-*i* may support multiple hierarchical modulation layers and/or interference cancellation. The base station 105-*e* may be an example of the base station of FIGS. 1, 2, 3, 10, and/or 17, while the UE 115-*i* may be an example of the UE of FIGS. 1, 2, 3, 10, and/or 18. The MIMO communication system 1900 may illustrate aspects of the systems 100, 200, 300, and/or 1000 of FIGS. 1, 2, 3, and/or 10.

The base station 105-*e* may be equipped with antennas 1934-*a* through 1934-*x*, and the UE 115-*i* may be equipped with antennas 1952-*a* through 1952-*n*. In the MIMO communication system 1900, the base station 105-*e* may be able to send data over multiple communication links at the same time. Each communication link may be called a "spatial layer" and the "rank" of the communication link may indicate the number of spatial layers used for communication. For example, in a 2×2 MIMO system where base station 105-*e* transmits two "spatial layers," the rank of the communication link between the base station 105-*e* and the UE 115-*i* is two.

At the base station 105-*e*, a transmit (Tx) processor 1920 may receive data from a data source. The transmit processor 1920 may process the data. The transmit processor 1920 may also generate reference symbols, and a cell-specific reference signal. A transmit (Tx) MIMO processor 1930 may perform spatial processing (e.g., precoding) on data symbols, control symbols, and/or reference symbols, if applicable, and may provide output symbol streams to the modulators/demodulators 1932-*a* through 1932-*x*. Each modulator/demodulator 1932 may process a respective output symbol stream (e.g., for OFDM, etc.) to obtain an output sample stream. Each modulator/demodulator 1932 may further process (e.g., convert to analog, amplify, filter, and upconvert) the output sample stream to obtain a downlink (DL) signal. In one example, DL signals from modulators/demodulators 1932-*a* through 1932-*x* may be transmitted via the antennas 1934-*a* through 1934-*x*, respectively.

At the UE 115-*i*, the antennas 1952-*a* through 1952-*n* may receive the DL signals from the base station 105-*e* and may provide the received signals to the demodulators 1954-*a* through 1954-*n*, respectively. Each demodulator 1954 may condition (e.g., filter, amplify, downconvert, and digitize) a respective received signal to obtain input samples. Each demodulator 1954 may further process the input samples (e.g., for OFDM, etc.) to obtain received symbols. A MIMO detector 1956 may obtain received symbols from all the demodulators 1954-*a* through 1954-*n*, perform MIMO detection on the received symbols if applicable, and provide detected symbols. A receive (Rx) processor 1958 may process (e.g., demodulate, deinterleave, and decode) the detected symbols, providing decoded data for the UE 115-*i* to a data output, and provide decoded control information to a processor 1980, or memory 1982. The processor 1980 may include a module or function 1981 that may perform various functions related to hierarchical modulation and/or interference cancellation. For example, the module or function 1981 may perform some or all of the functions described above with reference to the FIGS. 1-18.

On the uplink (UL), at the UE 115-*i*, a transmit (Tx) processor 1964 may receive and process data from a data source. The transmit processor 1964 may also generate reference symbols for a reference signal. The symbols from the transmit processor 1964 may be precoded by a transmit (Tx) MIMO processor 1966 if applicable, further processed by the demodulators 1954-*a* through 1954-*n* (e.g., for SC-FDMA, etc.), and be transmitted to the base station 105-*e* in accordance with the transmission parameters received from the base station 105-*e*. At the base station 105-*e*, the UL signals from the UE 115-*i* may be received by the antennas 1934, processed by the modulators/demodulators 1932, detected by a MIMO detector 1936 if applicable, and further processed by a receive processor. The receive (Rx) processor 1938 may provide decoded data to a data output and to the processor 1940, or memory 1942. The processor 1940 may include a module or function 1941 that may perform various aspects related to hierarchical modulation and/or reference signal transmission. For example, the module or function 1941 may perform some or all of the functions described above with reference to FIGS. 1-18.

Figure 20:
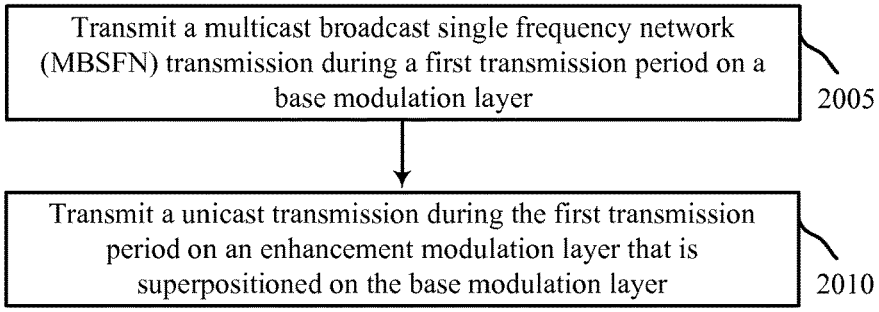
FIG. 20 is a flowchart of a method for wireless communications according to various examples.

FIG. 20 illustrates a method 2000 that may be carried out by a base station or other entity in a wireless communications system according to various embodiments. The method 2000 may, for example, be performed by a base station of FIGS. 1, 2, 3, 10, 17, and/or 19, or device 505 of FIGS. 5 and/or 12, or using any combination of the devices described for these figures. Initially, at block 2005, the base station may transmit a multicast broadcast single frequency network (MBSFN) transmission during a first transmission period on a base modulation layer. At block 2010, the base station may transmit a unicast transmission during the first transmission period on an enhancement modulation layer that is superpositioned on the base modulation layer. The operation(s) at blocks 2005 and 2010 may be performed using the base station hierarchical modulation module 520 described with reference to FIG. 5, and/or the base station HM module 1770 described with reference to FIG. 17.

Thus, the method 2000 may provide for wireless communication. It should be noted that the method 2000 is just one implementation and that the operations of the method 2000 may be rearranged or otherwise modified such that other implementations are possible.

Figure 21:
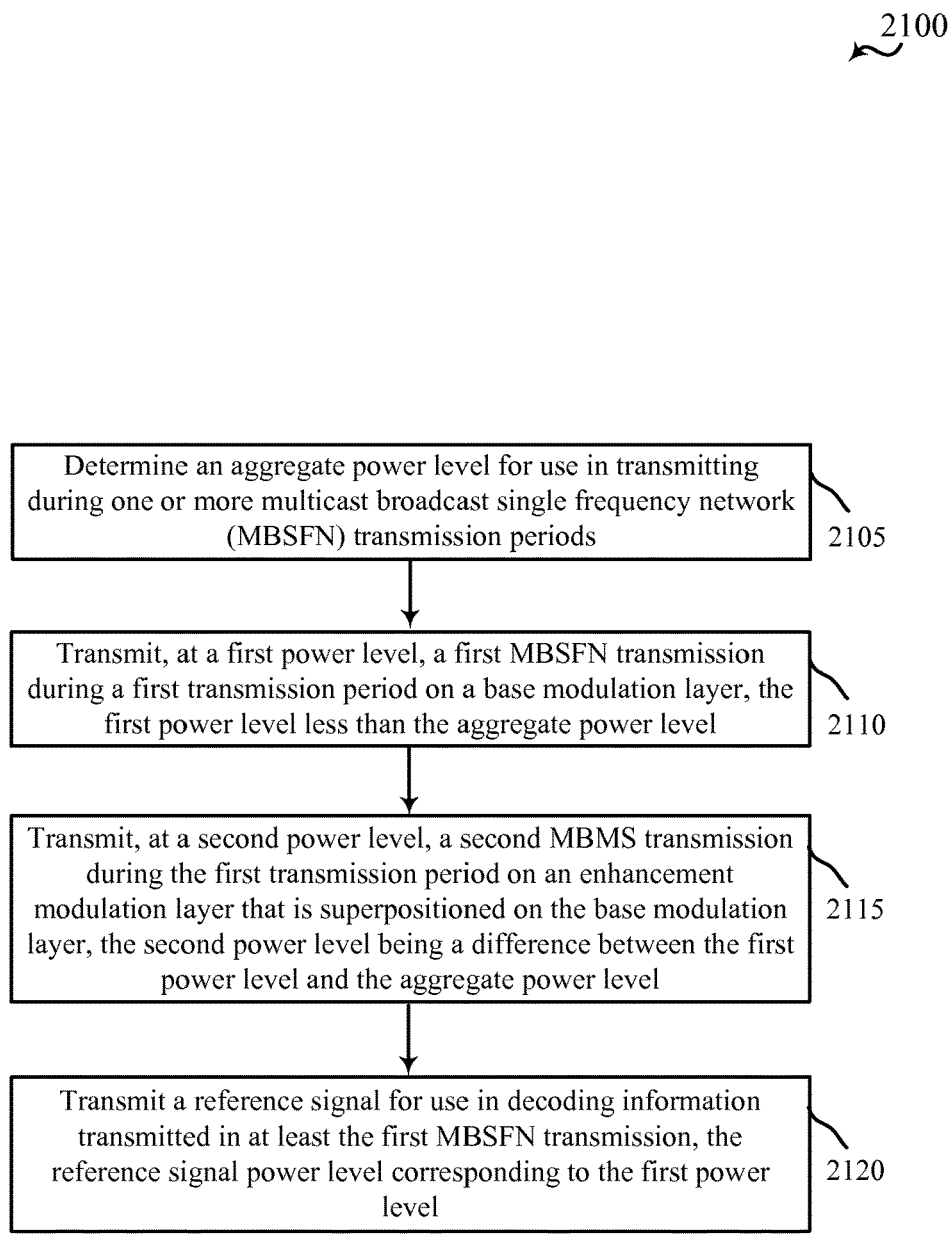
FIG. 21 is a flowchart of another method for wireless communications according to various examples.

FIG. 21 illustrates a method 2100 that may be carried out by a base station or other entity in a wireless communications system according to various embodiments. The method 2100 may, for example, be performed by a base station of FIGS. 1, 2, 3, 10, 17, and/or 19, or device 505 of FIGS. 5 and/or 12, or using any combination of the devices described for these figures. Initially, at block 2105, the base station may determine an aggregate power level for use in transmitting during one or more MBSFN transmission periods. At block 2110, the base station may transmit, at a first power level, a first MBSFN transmission during a first transmission period on a base modulation layer, the first power level less than the aggregate power level.

At block 2115, the base station may transmit, at a second power level, a second MBSFN transmission during the first transmission period on an enhancement modulation layer that is superpositioned on the base modulation layer, the second power level being a difference between the first power level and the aggregate power level. At block 2120, the base station may transmit a reference signal for use in decoding information transmitted in at least the first MBSFN transmission, the reference signal power level corresponding to the first power level. The operation(s) at blocks 2105 through 2120 may be performed using the base station hierarchical modulation module 520-*a* described with reference to FIG. 12, and/or the base station HM module 1770 described with reference to FIG. 17.

Thus, the method 2100 may provide for wireless communication. It should be noted that the method 2100 is just one implementation and that the operations of the method 2100 may be rearranged or otherwise modified such that other implementations are possible.

Figure 22:
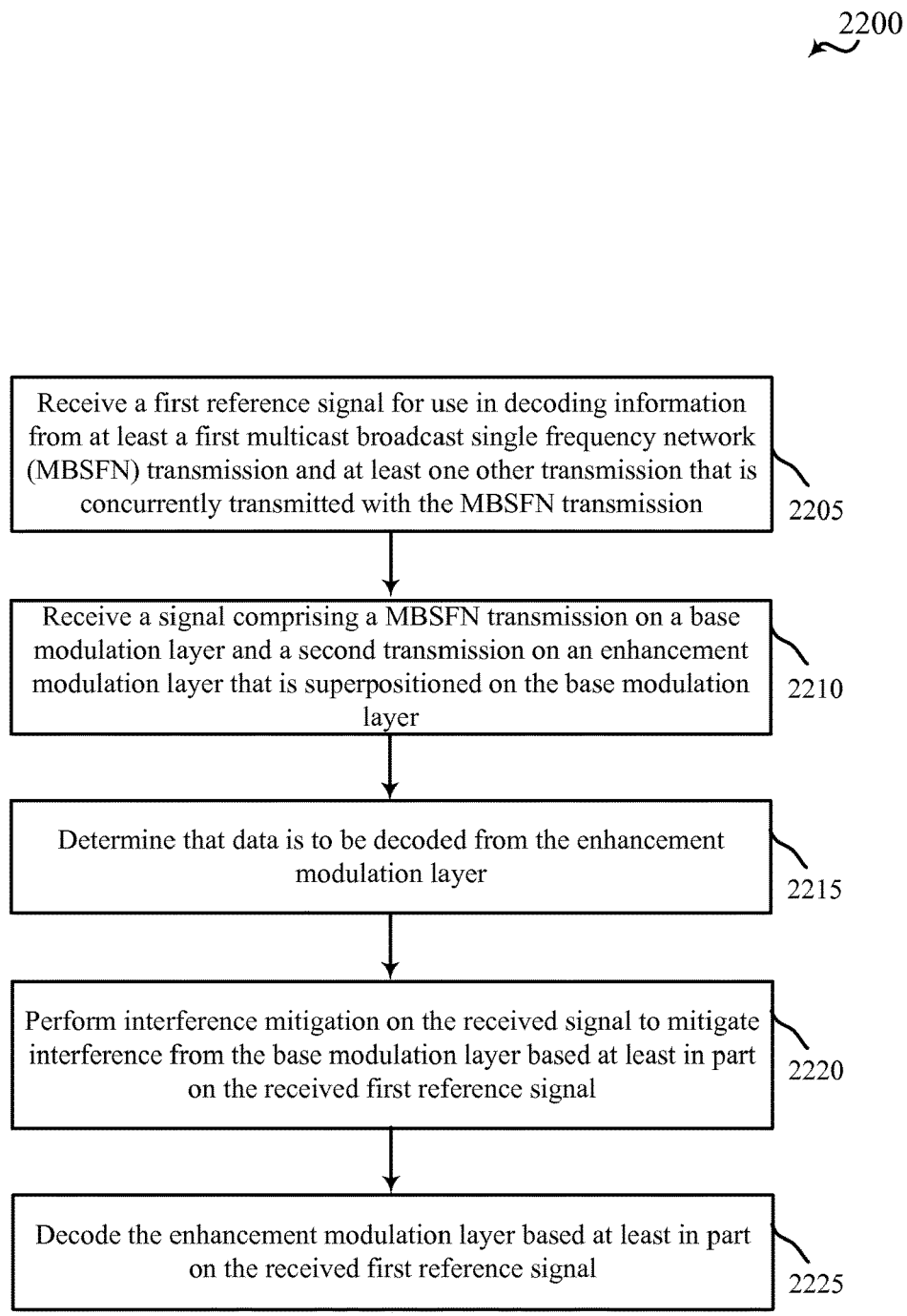
FIG. 22 is a flowchart of another method for wireless communications according to various examples.

FIG. 22 illustrates a method 2200 that may be carried out by a user equipment or other entity in a wireless communications system according to various embodiments. The method 2200 may, for example, be performed by a UE of FIGS. 1, 2, 3, 10, 18, and/or 19, or device 1405 of FIGS. 14 and/or 15, or using any combination of the devices described for these figures. Initially, at block 2205, the UE may receive a first reference signal for use in decoding information from at least a first MBSFN transmission and at least one other transmission that is concurrently transmitted with the MBSFN transmission. At block 2210, the UE may receive a signal comprising the first MBSFN transmission on a base modulation layer and a second MBSFN transmission on an enhancement modulation layer that is superpositioned on the base modulation layer.

At block 2215, the UE may determine that data is to be decoded from the enhancement modulation layer. At block 2220, the UE may perform interference mitigation on the received signal to mitigate interference from the base modulation layer based at least in part on the received first reference signal. At block 2225, the UE may decode the enhancement modulation layer based at least in part on the received first reference signal. The operation(s) at blocks 2205 through 2225 may be performed using the UE hierarchical modulation module 1425 and/or the UE interference mitigation module 1420 described with reference to FIGS. 14 and/or 15, and/or the UE HM module 1860 described with reference to FIG. 18.

Thus, the method 2200 may provide for wireless communication. It should be noted that the method 2200 is just one implementation and that the operations of the method 2200 may be rearranged or otherwise modified such that other implementations are possible.

The detailed description set forth above in connection with the appended drawings describes exemplary embodiments and does not represent the only embodiments that may be implemented or that are within the scope of the claims. The term "example" or "exemplary" when used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   modulating multicast broadcast single frequency network (MBSFN) symbols on a base modulation layer for transmission during a first transmission period, the first transmission period comprising a first region and a second region non-overlapping in time with the first region;
   modulating unicast symbols on an enhancement modulation layer that is hierarchically modulated on the base modulation layer for transmission during the first transmission period;
   transmitting a first reference signal for use in decoding the modulated unicast symbols, wherein the first reference signal is transmitted in the first region of the first transmission period;
   transmitting a second reference signal for use in decoding the modulated MBSFN symbols, wherein the second reference signal is transmitted in the second region of the first transmission period;
   rate matching the modulated unicast symbols on the enhancement modulation layer around the second reference signal; and
   transmitting the modulated MBSFN symbols on the base modulation layer and the modulated unicast symbols on the hierarchically modulated enhancement modulation layer during the second region of the first transmission period based at least in part on the rate matching.

2. The method of claim 1, wherein the first reference signal is a user equipment (UE) specific reference signal (UE-RS) that is transmitted by a first transmitter on the enhancement modulation layer concurrently with a transmission of a MBSFN reference signal (MBSFN-RS) that is transmitted on the base modulation layer.

3. The method of claim 1, wherein both the modulated unicast symbols and the modulated MBSFN symbols are transmitted using an extended cyclic prefix.

4. The method of claim 1, wherein the first reference signal is transmitted in dedicated reference signal transmission resources.

5. The method of claim 1, wherein the first reference signal is transmitted in reference signal transmission resources shared with a physical downlink control channel (PDCCH).

6. The method of claim 1, wherein the modulated unicast symbols are transmitted using a set of code blocks transmitted during the first transmission period, and a data rate for each code block of the set of code blocks is determined based at least in part on a transmission time within the first transmission period.

7. The method of claim 6, wherein a data rate for one or more of the code blocks is a function of a time duration between the code blocks and the first reference signal.

8. The method of claim 7, further comprising:
   transmitting control information indicating data rates for the set of code blocks.

9. The method of claim 1, wherein one or more other unicast transmissions are transmitted on the base modulation layer outside of the first transmission period, and wherein one or more transmission parameters of the other unicast transmissions are based at least in part on a first channel state information (CSI) report associated with transmission resources of the other unicast transmissions, and
   wherein one or more transmission parameters of the modulated unicast symbols on the enhancement modulation layer are based at least in part on a second CSI report associated with transmission resources of the enhancement modulation layer.

10. The method of claim 9, wherein channel estimation for the transmission of the modulated unicast symbols on the enhancement modulation layer is determined based at least in part on a common reference signal (CRS) and a noise estimation for the transmission of the modulated unicast symbols on the enhancement modulation layer is determined based at least in part on a MBSFN reference signal.

11. A method for wireless communications, comprising:
    receiving, in a first region of a first transmission period, a first reference signal for use in decoding information from at least a unicast transmission on an enhancement modulation layer, wherein the first transmission period comprises the first region and the second region non-overlapping in time with the first region;
    receiving, in the second region of the first transmission period, a signal comprising symbols of a multicast broadcast single frequency network (MBSFN) transmission modulated on a base modulation layer and symbols of the unicast transmission modulated on the enhancement modulation layer that is hierarchically modulated on the base modulation layer;
    receiving, in the second region of the first transmission period, a second reference signal for use in decoding the symbols of the MBSFN transmission;
    determining that data is to be decoded from the enhancement modulation layer;
    performing interference mitigation on the received signal to mitigate interference from the base modulation layer;
    de-rate matching the symbols of the unicast transmission modulated on the enhancement modulation layer around the second reference signal; and
    decoding the enhancement modulation layer based at least in part on the received first reference signal and the de-rate matching.

12. The method of claim 11, further comprising:
    receiving control signaling indicating timing for receiving the first reference signal and at least the second reference signal related to the MBSFN transmission.

13. The method of claim 12, wherein the first reference signal is a user equipment (UE) specific reference signal (UE-RS) that is transmitted by a first transmitter on the base modulation layer concurrently with a transmission of the second reference signal that is transmitted on the base modulation layer.

14. The method of claim 11, further comprising:
performing channel estimation based on the first reference signal.

15. The method of claim 11, wherein the unicast transmission is transmitted using a set of code blocks transmitted during the first transmission period, and a data rate for each code block of the set of code blocks is determined based at least in part on a transmission time within the first transmission period.

16. The method of claim 11, further comprising:
performing channel estimation for the unicast transmission transmitted on the enhancement modulation layer based at least in part on the first reference signal, wherein the first reference signal is a common reference signal (CRS); and
performing a noise estimation for the unicast transmission transmitted on the enhancement modulation layer based at least in part on a MBSFN reference signal.

17. An apparatus for wireless communications, comprising a processor, memory in electronic communication with the processor and instructions stored in the memory, the instructions being executable by the processor to:
modulate multicast broadcast single frequency network (MBSFN) symbols on a base modulation layer for transmission during a first transmission period, the first transmission period comprising a first region and a second region non-overlapping in time with the first region;
modulate unicast symbols on an enhancement modulation layer that is hierarchically modulated on the base modulation layer for transmission during the first transmission period;
transmit a first reference signal for use in decoding the modulated unicast symbols, wherein the first reference signal is transmitted in the first region of the first transmission period;
transmit a second reference signal for use in decoding the modulated MBSFN symbols, wherein the second reference signal is transmitted in the second region of the first transmission period;
rate match the modulated unicast symbols on the enhancement modulation layer around the second reference signal; and
transmit the modulated MBSFN symbols on the base modulation layer and the modulated unicast symbols on the hierarchically modulated enhancement modulation layer during the second region of the first transmission period based at least in part on the rate matching.

18. The apparatus of claim 17, wherein the first reference signal is a user equipment (UE) specific reference signal (UE-RS) that is transmitted by a first transmitter on the enhancement modulation layer concurrently with a transmission of a MBSFN reference signal (MBSFN-RS) that is transmitted on the base modulation layer.

19. The apparatus of claim 17, wherein both the modulated unicast symbols and the modulated MBSFN symbols are transmitted using an extended cyclic prefix.

20. The apparatus of claim 17, wherein the first reference signal is transmitted in dedicated reference signal transmission resources.

21. The apparatus of claim 17, wherein the first reference signal is transmitted in reference signal transmission resources shared with a physical downlink control channel (PDCCH).

22. The apparatus of claim 17, wherein the modulated unicast symbols are transmitted using a set of code blocks transmitted during the first transmission period, and a data rate for each code block of the set of code blocks is determined based at least in part on a transmission time within the first transmission period.

23. The apparatus of claim 22, wherein a data rate for one or more of the code blocks spaced further in time away from the first reference signal is higher than a data rate for one or more of the code blocks spaced closer in time to the first reference signal.

24. An apparatus for wireless communications, comprising a processor, memory in electronic communication with the processor and instructions stored in the memory, the instructions being executable by the processor to:
receive, in a first region of a first transmission period, a first reference signal for use in decoding information from at least a unicast transmission on an enhancement modulation layer, wherein the first transmission period comprises the first region and the second region non-overlapping in time with the first region;
receive, in the second region of the first transmission period, a signal comprising symbols of a multicast broadcast single frequency network (MBSFN) transmission modulated on a base modulation layer and symbols of the unicast transmission modulated on the enhancement modulation layer that is hierarchically modulated on the base modulation layer;
receive, in the second region of the first transmission period, a second reference signal for use in decoding the symbols of the MBSFN transmission;
determine that data is to be decoded from the enhancement modulation layer;
perform interference mitigation on the received multi-layer signal to mitigate interference from the base modulation layer;
de-rate match the symbols of the unicast transmission modulated on the enhancement modulation layer around the second reference signal; and
decode the enhancement modulation layer based at least in part on the received first reference signal and the de-rate matching.

* * * * *